(12) United States Patent
Robert Safavi et al.

(10) Patent No.: US 11,973,594 B2
(45) Date of Patent: Apr. 30, 2024

(54) DEVICES, METHODS AND NON-TRANSITORY COMPUTER-READABLE MEDIUMS FOR ADAPTIVELY SELECTIVE RETRANSMISSION IN WIRELESS COMMUNICATIONS

(71) Applicant: Huawei Technologies Co., Ltd., Shenzhen (CN)

(72) Inventors: Anahid Robert Safavi, Kista (SE); Alberto Giuseppe Perotti, Segrate (IT); Branislav M. Popovic, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 622 days.

(21) Appl. No.: 17/149,477

(22) Filed: Jan. 14, 2021

(65) Prior Publication Data
US 2021/0135785 A1 May 6, 2021

Related U.S. Application Data

(63) Continuation of application No. PCT/EP2018/076399, filed on Sep. 28, 2018.

(51) Int. Cl.
*H04L 1/00* (2006.01)
*H04L 1/1812* (2023.01)
(Continued)

(52) U.S. Cl.
CPC .......... *H04L 1/0061* (2013.01); *H04L 1/1819* (2013.01); *H04L 5/0055* (2013.01); *H04W 72/23* (2023.01)

(58) Field of Classification Search
CPC ... H04L 1/0061; H04L 1/1819; H04L 5/0055; H04L 1/1874; H04W 72/23
See application file for complete search history.

(56) References Cited

U.S. PATENT DOCUMENTS

| | | | |
|---|---|---|---|
| 9,444,585 B2 | 9/2016 | Bai et al. | |
| 2015/0341146 A1* | 11/2015 | Chunlong | H04L 1/1819 375/144 |
| 2019/0103946 A1* | 4/2019 | Li | H04L 1/1887 |

FOREIGN PATENT DOCUMENTS

| | | | | |
|---|---|---|---|---|
| WO | WO-2014185703 A1 * | 11/2014 | | H04L 1/1867 |
| WO | 2016060598 A1 | 4/2016 | | |

(Continued)

OTHER PUBLICATIONS

Dahlman et al. 4G, LTE-Advanced Pro and The Road to 5G, Elsevier Academic Press, 2016 (Year: 2016).*

(Continued)

*Primary Examiner* — Ayaz R Sheikh
*Assistant Examiner* — David Zhijun Sun
(74) *Attorney, Agent, or Firm* — Leydig, Voit & Mayer, Ltd.

(57) ABSTRACT

Devices, methods and non-transitory computer-readable medium for adaptively selective retransmissions in wireless communications are disclosed. The present application allows enhancing short packet data retransmission performance under short delay constraints. Using a retransmission indication for at least one segment of consecutive forward error correction (FEC) encoded bits reduces feedback signaling overhead compared to signaling retransmission requests individually for each of the coded bits. Accordingly, active hybrid automatic repeat request (HARQ) transmissions with low amounts of feedback information are enabled.

24 Claims, 15 Drawing Sheets

(51) Int. Cl.
*H04L 5/00* (2006.01)
*H04W 72/23* (2023.01)

(56) References Cited

FOREIGN PATENT DOCUMENTS

| WO | 2018144560 A1 | 8/2018 | | |
|---|---|---|---|---|
| WO | WO-2018144560 A1 | * | 8/2018 | ............ H03M 13/09 |

OTHER PUBLICATIONS

"3rd Generation Partnership Project; Technical Specification Group Radio Access Network; NR; Physical channels and modulation (Release 15)," 3GPP TS 38.211 V15.2.0, total 96 pages, 3rd Generation Partnership Project, Valbonne, France (Jun. 2018).

"3rd Generation Partnership Project; Technical Specification Group Radio Access Network; NR; Multiplexing and channel coding (Release 15)," 3GPP TS 38.212 V15.2.0, total 98 pages, 3rd Generation Partnership Project, Valbonne, France (Jun. 2018).

"3rd Generation Partnership Project; Technical Specification Group Radio Access Network; NR; Physical layer procedures for control (Release 15)," 3GPP TS 38.213 V15.2.0, total 99 pages, 3rd Generation Partnership Project, Valbonne, France (Jun. 2018).

"3rd Generation Partnership Project; Technical Specification Group Radio Access Network; NR; Physical layer procedures for data (Release 15)," 3GPP TS 38.214 V15.0.0, total 71 pages, 3rd Generation Partnership Project, Valbonne, France (Dec. 2017).

"3rd Generation Partnership Project; Technical Specification Group Radio Access Network; NR; Medium Access Control (MAC) protocol specification (Release 15)," 3GPP TS 38.321 V15.1.0, total 67 pages, 3rd Generation Partnership Project, Valbonne, France (Mar. 2018).

"3rd Generation Partnership Project; Technical Specification Group Radio Access Network; Study on Scenarios and Requirements for Next Generation Access Technologies; (Release 15)," 3GPP TR 38.913 V15.0.0, total 39 pages, 3rd Generation Partnership Project, Valbonne, France (Jun. 2018).

Price et al., "A Survey on Trapping Sets and Stopping Sets," https://arxiv.org/abs/1705.05996, arXiv:1705.05996v1 [cs.IT], total 13 pages (May 17, 2017).

Koetter et al., "Characterizations of Pseudo-Codewords of LDPC Codes," arXiv:cs/0508049v3 [cs.IT], total 21 pages (Aug. 17, 2005).

Karimi et al., "Efficient Algorithm for Finding Dominant Trapping Sets of LDPC Codes," IEEE Transactions on Information Theory, vol. 58, No. 11, pp. 6942-6958, Institute of Electrical and Electronics Engineers, New York, New York (Nov. 2012).

Polyanskiy et al., "Feedback in the Non-Asymptotic Regime," IEEE Transactions on Information Theory, vol. 57, No. 8, pp. 4903-4925, Institute of Electrical and Electronics Engineers, New York, New York (Aug. 2011).

Vakilinia et al., "Feedback Systems using Non-Binary LDPC Codes with a Limited Number of Transmissions," ITW, pp. 167-171 (2014).

Wang et al., "Finding All Small Error-Prone Substructures in LDPC Codes," IEEE Transactions on Information Theory, vol. 55, No. 5, pp. 1976-1999, Institute of Electrical and Electronics Engineers, New York, New York (May 2009).

Vakilinia et al., "Optimizing Transmission Lengths for Limited Feedback With Nonbinary LDPC Examples," IEEE Transactions on Communications, vol. 64, No. 6, pp. 2245-2257, Institute of Electrical and Electronics Engineers, New York, New York (Jun. 2016).

Vakilinia et al., "Short-Blocklength Non-Binary LDPC Codes with Feedback-Dependent Incremental Transmissions," 2014 IEEE International Symposium on Information Theory, pp. 426-430, Institute of Electrical and Electronics Engineers, New York, New York (2014).

Diao et al., "Trapping Set Structure of LDPC Codes on Finite Geometries," 2013 Information Theory and Applications Workshop (ITA), total 8 pages (May 2013).

* cited by examiner ns are provided from the dependent claims, the description and the figures.
DEVICES, METHODS AND NON-TRANSITORY COMPUTER-READABLE MEDIUMS FOR ADAPTIVELY SELECTIVE RETRANSMISSION IN WIRELESS COMMUNICATIONS

CROSS-REFERENCE TO RELATED APPLICATIONS

This application is a continuation of International Application No. PCT/EP2018/076399, filed on Sep. 28, 2018, the disclosure of which is hereby incorporated by reference in its entirety.

TECHNICAL FIELD

The present disclosure relates to the field of wireless communications, and more particularly to receiving and transmitting network devices for wireless communication, and related methods and non-transitory computer-readable mediums.

BACKGROUND

The fifth generation (5G) or so called new radio (NR) wireless networks allow providing new wireless communication services with larger data rates and, at the same time, increased reliability for relatively short packets under predefined delay constraints, also known as ultra-reliable low-latency communication (URLLC).

The URLLC reliability requirements of NR include a target for user plane latency that is 0.5 milliseconds (ms) for uplink (UL), and 0.5 ms for downlink (DL). A general URLLC reliability requirement for one transmission of a packet is $1-10^{-5}$ for 32 bytes with a user plane latency of 1 ms. The reliability target is set for an initial transmission of small data packets of 32 bytes and a target block error rate (BLER) is $10^{-5}$. User plane latency accounts for transmission latency, processing latency, retransmission latency and queuing latency (including scheduling and grant reception, if any).

However, current standards do not define any concrete latency requirements for subsequent transmissions or retransmissions. Yet, fulfillment of delay constraints can be challenging e.g. in scenarios with a large number of URLLC users to be scheduled, such as in UL. Each uplink data initial transmission and retransmission on the physical uplink shared channel (PUSCH) is triggered by a physical downlink control channel (PDCCH) downlink control information (DCI) containing an UL scheduling grant. The corresponding DCI format comprises fields specifying various uplink data transmission properties, such as modulation order and coding rate, resource allocation, redundancy version, frequency hopping of data, and the number of retransmissions. Large delays can be introduced when there are many DL assignments to be sent, since the capacity of the DL control resources set (CORESET) is limited.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an object of the present application to allow adaptively selective retransmissions in wireless communications. The foregoing and other objects are achieved by the features of the independent claims. Further exemplary implementations are provided from the dependent claims, the description and the figures.

According to a first aspect, a receiving network device for wireless communication is provided. The receiving network device for wireless communication comprises a transceiver and a processor. The transceiver is configured to receive a hybrid automatic repeat request (HARQ) transmission from a transmitting network device. The processor is configured to detect one or more residual errors in the received HARQ transmission. The processor is further configured to send a retransmission request comprising a retransmission indication for at least one segment of consecutive forward error correction (FEC) encoded bits stored in a buffer of the transmitting network device. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing the spectral efficiency (SE) when a retransmission is using additional feedback compared to conventional NR HARQ. In other words, the present application allows active HARQ transmissions with low amounts of feedback information and improve SE.

In an exemplary implementation of the first aspect, the HARQ transmission comprises at least one segment of consecutive FEC encoded bits stored in the buffer of the transmitting network device. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information while improving SE.

In an exemplary implementation of the first aspect, the transceiver is further configured to receive or send a downlink control information (DCI) transmission comprising control information for the HARQ transmission. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information while improving SE.

In an exemplary implementation of the first aspect, the processor is further configured to determine the at least one segment of consecutive FEC encoded bits to be retransmitted and stored in the buffer of the transmitting network device based on the control information. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information while improving SE.

In an exemplary implementation of the first aspect, the retransmission indication comprises a negative acknowledgement (NACK) signal. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information while increasing SE.

In an exemplary implementation of the first aspect, the retransmission indication further comprises an indication of a dynamically determined starting position of the at least one segment of consecutive FEC encoded bits. As a result, feedback signaling overhead is reduced compared to signaling retransmission requests individually for each of the coded bits.

In an exemplary implementation of the first aspect, the processor is further configured to perform the dynamic determination of the starting position of the at least one segment of consecutive FEC encoded bits based on minimizing sum reliability of segments of consecutive FEC decoded bits stored in a buffer of the receiving network device. As a result, feedback signaling overhead is reduced compared to signaling retransmission requests individually for each of the coded bits.

In an exemplary implementation of the first aspect, the retransmission indication further comprises an indication of a length of the at least one segment of consecutive FEC encoded bits. As a result, feedback signaling overhead is reduced compared to signaling retransmission requests individually for each of the coded bits while increasing SE.

In an exemplary implementation of the first aspect, the transceiver is further configured to receive the HARQ retransmissions based on a predetermined retransmission profile. The retransmission profile comprises retransmission occasion specific segment length indicators. Using the predetermined retransmission profile allows increasing achieved spectral efficiency e.g. in a bundle in a PUSCH retransmission in which retransmission parameters such as modulation and coding scheme (MCS) and retransmission length are kept constant across initial transmissions and all retransmissions. Furthermore, using the predetermined retransmission profile allows reducing the size of a DL DCI by introducing a new DL DCI format in which a resource allocation field is omitted for UL HARQ retransmissions. In other words, using the predetermined retransmission profile allows using of shortened DCIs for scheduling of PDSCH or PUSCH retransmissions.

In an exemplary implementation of the first aspect, the processor is further configured to determine the segment length of the at least one segment of consecutive FEC encoded bits based on the predetermined retransmission profile and the length of the first HARQ transmission occasion. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information while increasing SE.

In an exemplary implementation of the first aspect, at least one retransmission occasion specific segment length indicator in the retransmission profile provides indication for a shorter retransmission segment than the first HARQ transmission segment. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information while increasing SE.

In an exemplary implementation of the first aspect, the transceiver is further configured to receive or send a differential resource allocation indication for the requested retransmission. The differential resource allocation indication indicates resource allocations to be added or removed with respect to the initially received HARQ transmission. Since differential resource allocation indications are typically smaller than conventional resource allocation indications, the size of corresponding control messages becomes shorter and thus the overall amount of control signaling is reduced.

In an exemplary implementation of the first aspect, the buffer of the transmitting network device comprises a circular buffer. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information.

In an exemplary implementation of the first aspect, the receiving network device comprises one of a client device and a network node device, and the transmitting network device comprises one of the network node device and the client device, respectively. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information while increasing SE.

According to a second aspect, a method is provided. The method comprises receiving, at a receiving network device for wireless communication, a hybrid automatic repeat request (HARQ) transmission from a transmitting network device. The method further comprises detecting, by the receiving network device, one or more residual errors in the received HARQ transmission. The method further comprises sending, by the receiving network device, a retransmission request comprising a retransmission indication for at least one segment of consecutive forward error correction (FEC) encoded bits stored in a buffer of the transmitting network device. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information while increasing SE.

In an exemplary implementation of the second aspect, the HARQ transmission comprises at least one segment of consecutive FEC encoded bits stored in the buffer of the transmitting network device. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information while increasing SE.

In an exemplary implementation of the second aspect, the method further comprises receiving or sending a downlink control information (DCI) transmission comprising control information for the HARQ transmission. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information while increasing SE.

In an exemplary implementation of the second aspect, the determination of the at least one segment of consecutive FEC encoded bits to be retransmitted and stored in the buffer of the transmitting network device is performed based on the received control information. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information while increasing SE.

In an exemplary implementation of the second aspect, the retransmission indication comprises a negative acknowledgement (NACK) signal. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information while increasing SE.

In an exemplary implementation of the second aspect, the retransmission indication further comprises an indication of a dynamically determined starting position of the at least one segment of consecutive FEC encoded bits. As a result, feedback signaling overhead is reduced compared to signaling retransmission requests individually for each of the coded bits.

In an exemplary implementation of the second aspect, the dynamic determination of the starting position of the at least one segment of consecutive FEC encoded bits is performed based on minimizing sum reliability of segments of consecutive FEC decoded bits stored in a buffer of the receiving network device. As a result, feedback signaling overhead is reduced compared to signaling retransmission requests individually for each of the coded bits.

In an exemplary implementation of the second aspect, the retransmission indication further comprises an indication of a length of the at least one segment of consecutive FEC encoded bits. As a result, feedback signaling overhead is reduced compared to signaling retransmission requests individually for each of the coded bits.

In an exemplary implementation of the second aspect, the method further comprises receiving the HARQ retransmissions based on a predetermined retransmission profile. The retransmission profile comprises retransmission occasion specific segment length indicators. Using the predetermined retransmission profile allows increasing achieved spectral efficiency e.g. in a bundle in a PUSCH retransmission in which retransmission parameters such as modulation and coding scheme (MCS) and retransmission length are kept constant across initial transmissions and all retransmissions. Furthermore, using the predetermined retransmission profile allows reducing the size of a DL DCI by introducing a new DL DCI format in which a resource allocation field is omitted for UL HARQ retransmissions. In other words, using the predetermined retransmission profile allows using of shortened DCIs for scheduling of PDSCH or PUSCH retransmissions.

In an exemplary implementation of the second aspect, the segment length of the at least one segment of consecutive FEC encoded bits is determined based on the predetermined retransmission profile and the length of the first HARQ transmission occasion. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information while increasing SE.

In an exemplary implementation of the second aspect, at least one retransmission occasion specific segment length indicator in the retransmission profile provides indication for a shorter retransmission segment than the first HARQ transmission segment. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows reducing the amount of feedback information when a retransmission is using additional feedback compared to conventional NR HARQ. In other words, the present application allows active HARQ transmissions with low amounts of feedback information while increasing SE.

In an exemplary implementation of the second aspect, the method further comprises receiving or sending a differential resource allocation indication for the requested retransmission. The differential resource allocation indication indicates resource allocations to be added or removed with respect to the initially received HARQ transmission. Since differential resource allocation indications are typically smaller than conventional resource allocation indications, the size of corresponding control messages becomes shorter and thus the overall amount of control signaling is reduced.

In an exemplary implementation of the second aspect, the buffer of the transmitting network device comprises a circular buffer. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information while increasing SE.

In an exemplary implementation of the second aspect, the receiving network device comprises one of a client device and a network node device, and the transmitting network device comprises one of the network node device and the client device, respectively. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information while increasing SE.

According to a third aspect, a non-transitory computer-readable medium is provided. The non-transitory computer-readable medium comprises computer-executable instructions stored thereon, the computer-executable instructions, when executed by one or more processor, cause a processor to facilitate performing the method according to the second aspect. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information while increasing SE.

According to a fourth aspect, a transmitting network device for wireless communication is provided. The transmitting network device for wireless communication comprises a transceiver and a processor. The transceiver is configured to transmit a hybrid automatic repeat request (HARQ) transmission to a receiving network device. The transceiver is further configured to receive a retransmission request comprising a retransmission indication for at least one segment of consecutive forward error correction (FEC) encoded bits stored in a buffer of the transmitting network device. The processor is configured to determine the at least one segment of consecutive FEC encoded bits stored in the buffer of the transmitting network device to be retransmitted based on the received retransmission indication. The transceiver is further configured to retransmit the determined at least one segment of consecutive FEC encoded bits to the receiving network device. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information while increasing SE.

In an exemplary implementation of the fourth aspect, the HARQ transmission comprises at least one segment of consecutive FEC encoded bits stored in the buffer of the transmitting network device. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information while increasing SE.

In an exemplary implementation of the fourth aspect, the retransmission indication comprises a negative acknowledgement (NACK) signal. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information while increasing SE.

In an exemplary implementation of the fourth aspect, the retransmission indication further comprises an indication of a dynamically determined starting position of the at least one segment of consecutive FEC encoded bits. As a result, feedback signaling overhead is reduced compared to signaling retransmission requests individually for each of the coded bits.

In an exemplary implementation of the fourth aspect, the retransmission indication further comprises an indication of a length of the at least one segment of consecutive FEC encoded bits. As a result, feedback signaling overhead is reduced compared to signaling retransmission requests individually for each of the coded bits.

In an exemplary implementation of the fourth aspect, the processor is further configured to determine a starting position of the at least one segment of consecutive FEC encoded bits based on predetermined starting positions associated with each retransmission occasion. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information while increasing SE.

In an exemplary implementation of the fourth aspect, the processor is further configured to determine a length of the at least one segment of consecutive FEC encoded bits based on a predetermined retransmission profile. The retransmission profile comprises retransmission occasion specific segment length indicators. Using the predetermined retransmission profile allows increasing achieved spectral efficiency e.g. in a bundle in a PUSCH retransmission in which retransmission parameters such as modulation and coding scheme (MCS) and retransmission length are kept constant across initial transmissions and all retransmissions. Furthermore, using the predetermined retransmission profile allows reducing the size of a DL DCI by introducing a new DL DCI format in which a resource allocation field is omitted for UL HARQ retransmissions. In other words, using the predetermined retransmission profile allows using of shortened DCIs for scheduling of PDSCH or PUSCH retransmissions.

In an exemplary implementation of the fourth aspect, the segment length of the at least one segment of consecutive FEC encoded bits is based on the predetermined retransmission profile and the length of the first HARQ transmission occasion. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information while increasing SE.

In an exemplary implementation of the fourth aspect, at least one retransmission occasion specific segment length indicator in the retransmission profile provides indication for a shorter retransmission segment than the first HARQ transmission segment. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows reducing the amount of feedback information when a retransmission is using additional feedback compared to conventional NR HARQ. In other words, the present application allows active HARQ transmissions with low amounts of feedback information.

In an exemplary implementation of the fourth aspect, the transceiver is further configured to send or receive a differential resource allocation indication for the requested retransmission. The differential resource allocation indication indicates resource allocations to be added or removed with respect to the initially received HARQ transmission. The processor is further configured to adjust resource allocation accordingly for the requested retransmission. Since differential resource allocation indications are typically smaller than conventional resource allocation indications, the size of corresponding control messages becomes shorter and thus the overall amount of control signaling is reduced.

In an exemplary implementation of the fourth aspect, the transceiver is further configured to receive or send a resource allocation adjusted to the largest value in the retransmission profile. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information while increasing SE.

In an exemplary implementation of the fourth aspect, the buffer of the transmitting network device comprises a circular buffer. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information while increasing SE.

In an exemplary implementation of the fourth aspect, the transmitting network device comprises one of a network node device and a client device, and the receiving network device comprises one of the client device and the network node device, respectively. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information while increasing SE.

According to a fifth aspect, a method is provided. The method comprises transmitting a hybrid automatic repeat request (HARQ) transmission from a transmitting network device for wireless communication to a receiving network device. The method further comprises receiving, at the transmitting network device, a retransmission request comprising a retransmission indication for at least one segment of consecutive forward error correction (FEC) encoded bits stored in a buffer of the transmitting network device. The method further comprises determining, by the transmitting network device, the at least one segment of consecutive FEC encoded bits stored in the buffer of the transmitting network device to be retransmitted based on the received retransmission indication. The method further comprises retransmitting the determined at least one segment of consecutive FEC encoded bits from the transmitting network device to the receiving network device. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information.

In an exemplary implementation of the fifth aspect, the HARQ transmission comprises at least one segment of consecutive FEC encoded bits stored in the buffer of the transmitting network device. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information while increasing SE.

In an exemplary implementation of the fifth aspect, the retransmission indication comprises a negative acknowledgement (NACK) signal. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information while increasing SE.

In an exemplary implementation of the fifth aspect, the retransmission indication further comprises an indication of a dynamically determined starting position of the at least one segment of consecutive FEC encoded bits. As a result, feedback signaling overhead is reduced compared to signaling retransmission requests individually for each of the coded bits.

In an exemplary implementation of the fifth aspect, the retransmission indication further comprises an indication of a length of the at least one segment of consecutive FEC encoded bits. As a result, feedback signaling overhead is reduced compared to signaling retransmission requests individually for each of the coded bits.

In an exemplary implementation of the fifth aspect, the method further comprises determining a starting position of the at least one segment of consecutive FEC encoded bits based on predetermined starting positions associated with each retransmission occasion. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information while increasing SE.

In an exemplary implementation of the fifth aspect, the method further comprises determining a length of the at least one segment of consecutive FEC encoded bits based on a predetermined retransmission profile. The retransmission profile comprises retransmission occasion specific segment length indicators. Using the predetermined retransmission profile allows increasing achieved spectral efficiency e.g. in a bundle in a PUSCH retransmission in which retransmission parameters such as modulation and coding scheme (MCS) and retransmission length are kept constant across initial transmissions and all retransmissions. Furthermore, using the predetermined retransmission profile allows reducing the size of a DL DCI by introducing a new DL DCI format in which a resource allocation field is omitted for UL HARQ retransmissions. In other words, using the predetermined retransmission profile allows using of shortened DCIs for scheduling of PDSCH or PUSCH retransmissions.

In an exemplary implementation of the fifth aspect, the segment length of the at least one segment of consecutive FEC encoded bits is based on the predetermined retransmission profile and the length of the first HARQ transmission occasion. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information while increasing SE.

In an exemplary implementation of the fifth aspect, at least one retransmission occasion specific segment length indicator in the retransmission profile provides indication for a shorter retransmission segment than the first HARQ transmission segment. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information while increasing SE.

In an exemplary implementation of the fifth aspect, the method further comprises sending or receiving a differential resource allocation indication for the requested retransmission. The differential resource allocation indication indicates resource allocations to be added or removed with respect to the initially received HARQ transmission. The method further comprises adjusting resource allocation accordingly for the requested retransmission. Since differential resource allocation indications are typically smaller than conventional resource allocation indications, the size of corresponding control messages becomes shorter and thus the overall amount of control signaling is reduced.

In an exemplary implementation of the fifth aspect, the method further comprises receiving or sending a resource allocation adjusted to the largest value in the retransmission profile. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information while increasing SE.

In an exemplary implementation of the fifth aspect, the buffer of the transmitting network device comprises a circular buffer. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information while increasing SE.

In an exemplary implementation of the fifth aspect, the transmitting network device comprises one of a network node device and a client device, and the receiving network device comprises one of the client device and the network node device, respectively. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information while increasing SE.

According to a sixth aspect, a non-transitory computer-readable medium is provided. The non-transitory computer-readable medium comprises computer-executable instructions stored thereon, the computer-executable instructions, when executed by one or more processor, cause a processor to facilitate performing the method according to the fifth aspect. The present application allows enhancing short packet data retransmission performance under short delay constraints. Using the retransmission indication for at least one segment of consecutive FEC encoded bits reduces feedback signaling overhead compared to signaling retransmission requests individually for each of the coded bits. Furthermore, the present application allows increasing SE when a retransmission is using additional feedback compared to conventional NR HARQ. In other words, the present application allows active HARQ transmissions with low amounts of feedback information while increasing SE.

Many of the attendant features will be more readily appreciated as they become better understood by reference to the following detailed description considered in connection with the accompanying drawings.

DESCRIPTION OF THE DRAWINGS

In the following, example embodiments are described in more detail with reference to the attached figures and drawings, in which.

Figure 1A:
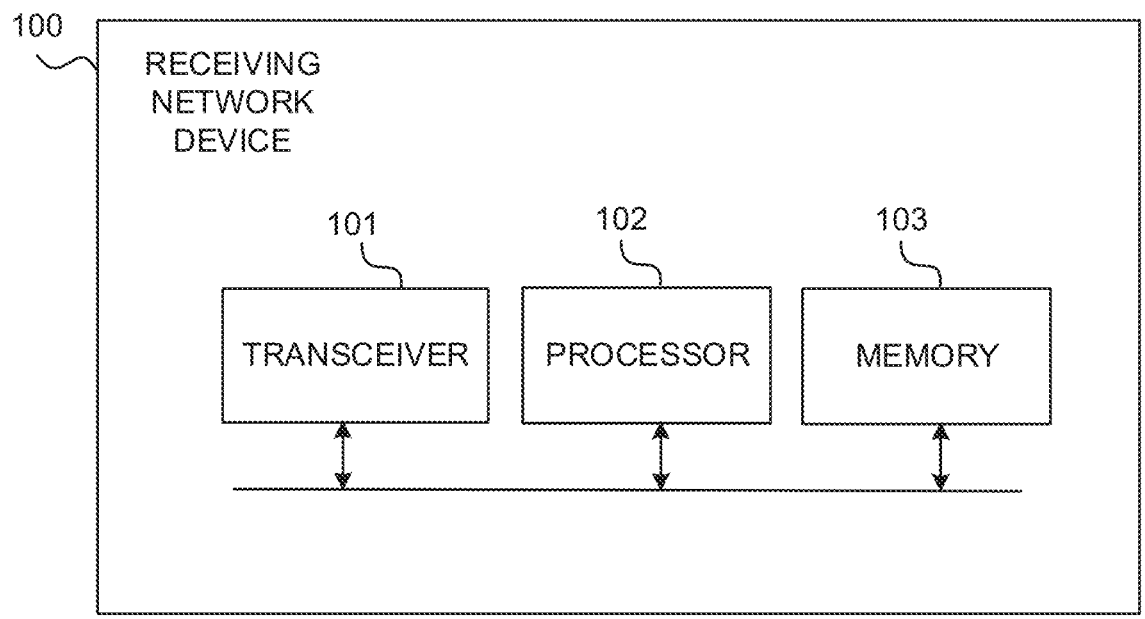
FIG. 1A is a block diagram illustrating a client device according to one exemplary embodiment.

In the following, identical reference signs refer to identical or at least functionally equivalent features.

DETAILED DESCRIPTION

In the following description, reference is made to the accompanying drawings, which form part of the disclosure, and in which are shown, by way of illustration, exemplary aspects in which the present application may be placed. It is understood that other aspects may be utilized and structural or logical changes may be made without departing from the scope of the present application. The following detailed description, therefore, is not to be taken in a limiting sense, as the scope of the present application is defined in the appended claims.

For instance, it is understood that a disclosure in connection with a described method may also hold true for a corresponding device or system configured to perform the method and vice versa. For example, if an exemplary method step is described, a corresponding device may include a unit to perform the described method step, even if such unit is not explicitly described or illustrated in the figures. On the other hand, for example, if an exemplary apparatus is described based on functional units, a corresponding method may include a step performing the described functionality, even if such step is not explicitly described or illustrated in the figures. Further, it is understood that the features of the various example aspects described herein may be combined with each other, unless specifically noted otherwise.

In the following, a general description of conventional active and non-active feedback is provided.

Active feedback or information feedback, sent to a transmitter from a receiver, instructs the transmitter about which (incremental redundancy) coded bit(s) to transmit in retransmissions. That is, upon reception of active feedback information the transmitter sends additional coded bit(s) which consist of incremental redundancy over the initial transmission. Information about how to compute incremental bits is obtained in the receiver based on reliability of soft coded bits after a decoding attempt. Thus, in the receiver, least reliable soft bit(s) after non-binary low-density parity check (NB-LDPC) decoding are requested to be sent in subsequent retransmissions. Moreover, the size and number of subsequent re-transmission is optimized for a given signal-to-noise ratio (SNR) and channel condition theoretically based on a closed form using a reciprocal Gaussian approximation.

Furthermore, in initial transmission a whole code word is transmitted without puncturing. The re-transmitted bits are obtained based on already transmitted bits in the code word.

Non-active feedback sent from a receiver to a transmitter, and using one bit NACK per code word in case of a decoding failure, requests retransmission of additional predefined coded bits. That is, there is no indication to the transmitter about which coded bits to transmit.

Conventionally, downlink control information is used in the transmitter to determine attributes for initial transmissions and possible retransmissions. Downlink control information is typically transmitted dynamically on a slot/subframe basis and is blindly decoded prior to actual data detection and decoding.

Additionally, in the case of a bundle in a PUSCH transmission, resource allocation for re-transmission are conventionally configured semi-statically and are not changed.

The conventional active feedback scheme is based on signaling $n_{sel}$ positions of least reliable bits where the reliability of each soft coded bit is computed as the magnitude of the corresponding soft bit value in the code word of length n. As both n and $n_{sel}$ are typically not small—about hundreds of bits in practice—the amount of feedback control information ($n_f$ bits) for the transmitter may be too large for the scheme to be of practical interest:

$$n_f = \log_2 \binom{n}{n_{sel}} \quad (1)$$

where $$\binom{n}{k} = \frac{n!}{k!(n-k)!}$$

denotes a binomial coefficient.

The conventional active feedback scheme derives an optimal number of transmissions and a length of each transmission for any given SNR, and then follows the determined scheme assuming that the determined retransmission scheme is known to both transmitter and receiver. Thus, a problem is that the number of transmissions and the length of each transmission are known a priori based on the SNR. This scheme cannot be implemented in practice because knowledge about SNR is not precise and may be different in the receiver than in the transmitter. Moreover, the procedure that produces the number and length of transmissions is too heavy to be executed in real-time in the transmitter/receiver. Furthermore, this procedure tends to generate a large number of retransmissions which is not suitable for latency-constrained transmissions.

In NR, the attributes of retransmissions (such as resource allocation) can be determined dynamically, using DCI formats. In the case of dynamic resource allocation, large DL control channels are needed, which may increase retransmission delays in case of high traffic for a PUSCH retransmission.

In the case of a bundle in a PUSCH transmission, where the initial resource allocation is configured semi-statically, allocations of resources for initial transmissions and retransmissions are not changed which may lead to low SE.

As will be discussed in more detail below, the present application n allows enhancing short packet data retransmission performance under short delay constraints. When retransmission is using additional feedback compared to baseline NR HARQ, the present application further allows increasing SE.

In cases—such as in a bundle in a PUSCH retransmission, where the retransmission parameters such as MCS and retransmission length are kept constant across initial transmissions and all retransmissions, using a predefined/fixed retransmission profile may increase the achieved SE.

In other cases—such as in PUSCH retransmissions, the predefined retransmission profile may be used to shorten the size of a DL DCI by introducing a new DL DCI format where the resource allocation field is omitted for the UL HARQ retransmissions.

Figure 3:
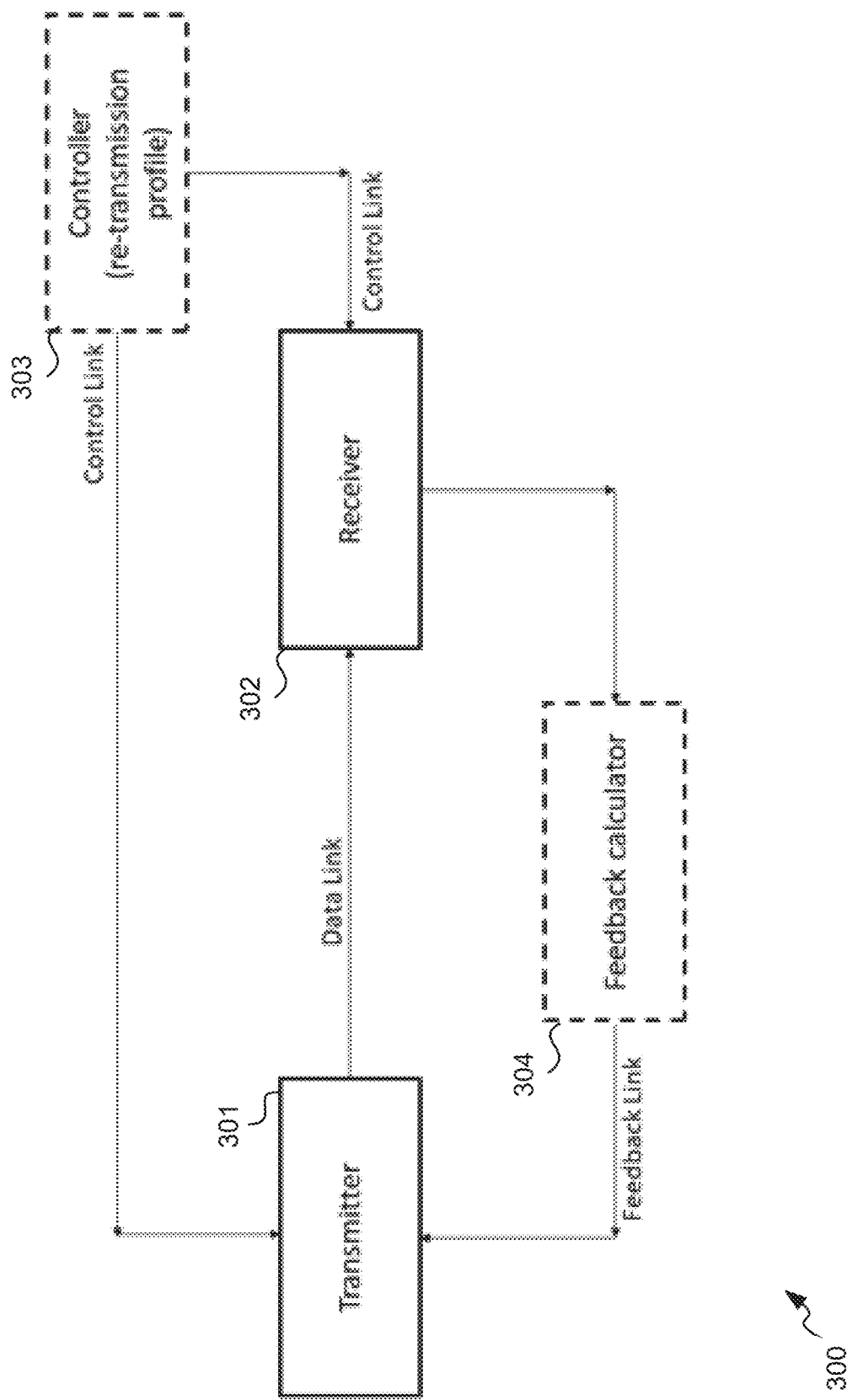
FIG. 3 is a block diagram illustrating a system according to one exemplary embodiment.

FIG. 3 shows an example of a system 300 according to one exemplary embodiment. A controller 303 may transmit or share to a transmitter 301 (corresponding to a transmitting network device 110 of FIG. 1B) and/or a receiver 302 (corresponding to a receiving network device 100 of FIG. 1A) parameters needed to correctly decode data in the receiver 302. A feedback calculator 304 may compute the feedback as discussed in more detail in the following embodiments. Data, control and feedback are sent over a data link, control link and feedback link, respectively.

Figure 1B:
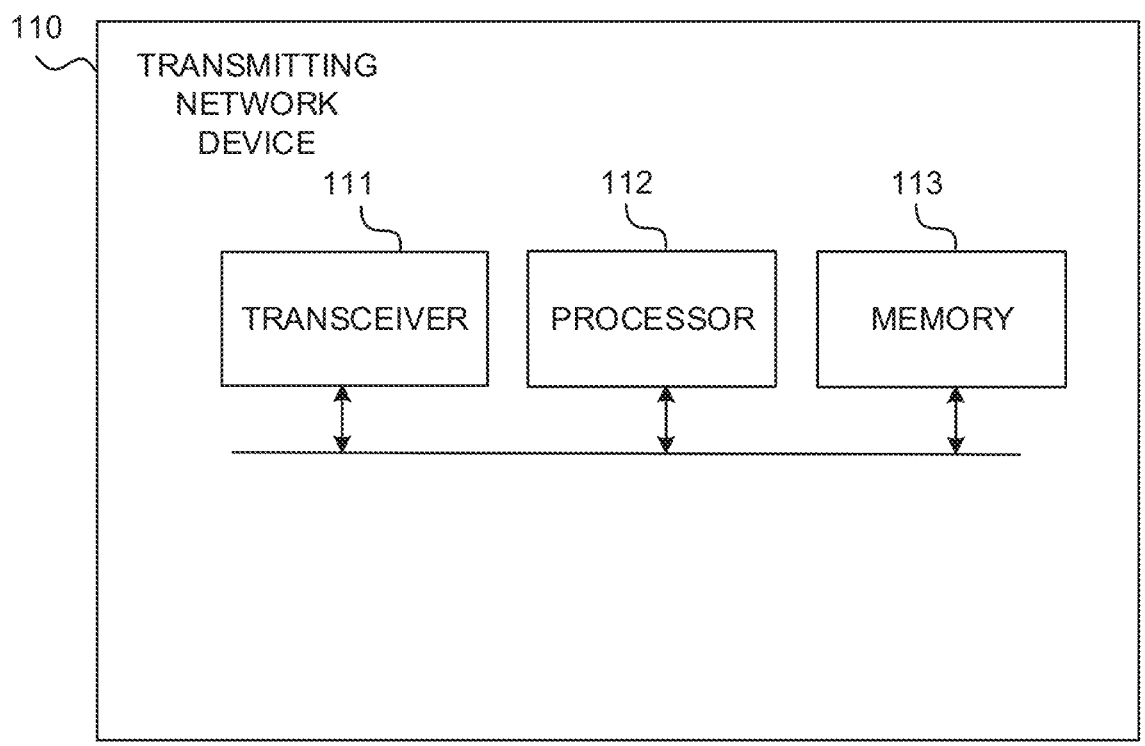
FIG. 1B is a block diagram illustrating a network node device according to one exemplary embodiment.

Next, example embodiments of the receiving network device 100 and the transmitting network device 110 are described based on FIGS. 1A and 1B. Some of the features of the described devices are optional features which provide further advantages.

FIG. 1A is a block diagram that illustrates the receiving network device 100 according to one embodiment. In an embodiment, the receiving network device 100 may comprise a client device that may be any of various types of devices used directly by an end user entity and capable of communication in a wireless network, such as a user equipment (UE). Such devices include but are not limited to smartphones, tablet computers, smart watches, lap top computers, Internet-of-Things (IoT) devices etc. Although embodiments may be described in terms of a client device, it is by way of example and in no way a limitation. In another embodiment, the receiving network device 100 may comprise a network node device that may include e.g. a base station, such as a macro-eNodeB, a pico-eNodeB, a home eNodeB, a fifth-generation base station (gNB) or any such device providing an air interface for client devices to connect to the wireless network via wireless transmissions. In an embodiment in which the receiving network device 100 of FIG. 1A comprises a client device, the transmitting network device 110 of FIG. 1B comprises a network node device, and vice versa.

According to an aspect, the receiving network device 100 may comprise a transceiver 101 and a processor or a processing unit 102 coupled to the transceiver 101, which may be used to implement the functionalities described below in more detail.

The processor 102 may include e.g. one or more of various processing devices, such as a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The receiving network device 100 may further comprise a memory 103 that is configured to store e.g. computer-executable codes and the like. The memory may include one or more volatile memory devices, one or more non-volatile memory devices, and/or a combination of one or more volatile memory devices and non-volatile memory devices. For example, the memory may be embodied as magnetic storage devices (such as hard disk drives, floppy disks, magnetic tapes, etc.), optical magnetic storage devices, and semiconductor memories (such as mask ROM, PROM (programmable ROM), EPROM (erasable PROM), flash ROM, RAM (random access memory), etc.).

The transceiver 101 is configured to receive a hybrid automatic repeat request (HARQ) transmission from the transmitting network device 110. The HARQ transmission may comprise at least one segment of consecutive forward error correction (FEC) encoded bits that are stored in a buffer of the transmitting network device 110. The buffer of the transmitting network device 110 may comprise a circular buffer, and it may be comprised e.g. in the memory 113.

The processor 102 is configured to detect one or more residual errors in the received HARQ transmission. The processor 102 is further configured to send a retransmission request comprising a retransmission indication for at least one segment of consecutive FEC encoded bits stored in the buffer of the transmitting network device 110. In other words, the retransmission request may comprise a retransmission indication for at least one of the received segments of consecutive FEC encoded bits in the received HARQ transmission. The at least one segment of consecutive FEC encoded bits indicated to be retransmitted may correspond with the detected one or more residual errors. In an example, the retransmission indication may comprise a negative acknowledgement (NACK) signal.

In a DL example (in which the receiving network device 100 comprises a client device), the transceiver 111 may be further configured to receive a downlink control information (DCI) transmission comprising control information for the HARQ transmission. In an UL example (in which the receiving network device 100 comprises a network node device), the transceiver 111 may be further configured to send a downlink control information (DCI) transmission comprising control information for the HARQ transmission. In both the DL and UL examples, the receiving network device 100 has knowledge of the control information for the HARQ transmission. Accordingly, the processor 102 may be further configured to determine the at least one segment of consecutive FEC encoded bits to be retransmitted and stored in the buffer of the transmitting network device based on the control information.

In other words, FEC encoding may be used to map a binary information message i [k bits] to a code word d=ε(i) [n bits] of a binary linear code, where a binary linear code of length n and dimension k<n is the null space of a (n−k)×n binary parity-check matrix (PCM). In other words, the code contains all the n-bit vectors w that check the parity equation Hw=0. For example, the NR low-density parity check (LDPC) encoder maps the information vector $i=(i_1, \ldots, i_k)$ (e.g. a transport block or a segment thereof) to a code word $d=(d_1, \ldots, d_n)$ of size n bits knowing that a code word is equal to any n-bit vector that checks the parity equation.

The code word $d=(d_1, d_2, \ldots d_n)$ is written in a circular buffer of size n. The content of the circular buffer is read out starting from position $l_{idx}=RV_{idx}Z$, where redundancy version $RV_{idx}$ is set to 0 for the initial transmission and has predefined value for each retransmission, and Z is a lifting factor. Each redundancy version determines where to start sequential reading of the circular buffer for each (re)transmission.

A code block $c_0$ of size $P_0$ is obtained for an initial transmission, where $P_0$ is the number of coded bits transmitted in the initial transmission. The size of $P_0$ is chosen so that $P_0 R_{init}=k$ where $R_{init}$ is the desired code rate for the initial transmission that is obtained from channel state information obtained as feedback information on the feedback link. The initial code block $c_0$ may be written as:

$$c_0=(c_{01}, c_{02}, \ldots, c_{0(P_0)})=(d_1, d_2, \ldots, d_{P_0}). \quad (2)$$

The code block $c_0$ is mapped to $s=\lceil P_0/m \rceil$ modulation symbols, where $M=2^m$ is the size of a modulator constellation. Modulation symbols are then transmitted over the channel.

In the receiving network device 100, demodulation and de-rate matching/combining are performed in order to obtain soft coded bits corresponding to each of the transmitted coded bits in $c_0$. After FEC decoding, the receiving network device 100 checks via cyclic redundancy check (CRC) whether the received packet has any residual error(s). If this is the case, the receiving network device 100 buffers the received soft coded bits in a soft buffer and issues a retransmission request through a feedback link to the transmitting network device 110. Conventionally, this is done by sending a single ACK/NACK bit per code word back to the transmitting network device 110. In some cases (e.g. a bundle) retransmissions may be activated without an explicit NACK, called implicit NACK.

In an example of the present application, an active HARQ NACK may include an indication of which coded bits the receiving network device 100 expects to be transmitted/retransmitted. That indication can be derived from the soft coded bits after FEC decoding. Accordingly, the soft coded bit value (that is, log likelihood of the certain coded bit) may be defined as:

$$\lambda_i = \log \frac{P(c_{0,i}=0 \mid y)}{P(c_{0,i}=1 \mid y)} \quad (3)$$

where y is the received signal, and the soft bit reliability may be defined as:

$$\rho_i = |\lambda_i|. \quad (4)$$

Retransmission of coded bits with low post-decoding reliability is beneficial. However, requesting retransmission of arbitrary coded bit patterns in a code word may be prohibitively complex due to the large amount of feedback information that the receiving network device 100 would generate on the feedback link (e.g. an amount according to Eq. (1)). Such an amount of feedback information may even exceed the code word length itself. Therefore, there is a need for solutions that sacrifice part of the gains of active HARQ feedback and, at the same time, generate smaller amounts of feedback information.

One solution involves performing retransmissions of consecutive coded bits in given segments of the circular buffer. To that purpose, for any given segment in the circular buffer—defined by its starting position $l_n$ and length $P_n$—a sum reliability may be evaluated as:

$$\Omega(l_n, P_n) = \Sigma_{i=l_n}^{(l_n+P_n-1)_{N_{cb}}} |\lambda_i|. \tag{5}$$

Here, $N_b$ [bits] is the circular buffer size and $(x)_a = 1+[(x-1) \bmod a]$. Thus, given a maximum number of coded bits $P_n$ that can be accommodated in a $n^{th}$ retransmission, the starting position $l_n^*$ of the segment being retransmitted may be dynamically determined as:

$$l_n^* = \arg\min_{l_n \in \{1,\ldots,N_{cb}\}} \Omega(l_n, P_n). \tag{6}$$

Thus, the segment $(l_n^*, P_n)$ having a minimum sum reliability among all the segments of the same length may be requested for retransmission by the receiving network device 100 which may send a NACK along with the segment's starting position $l_n^*$ and optionally or implicitly the segment length $P_n$.

Upon reception of the NACK and the starting position $l_n^*$ through the feedback link, the transmitting network device 110 may send further incremental coded bits according to that feedback information.

Upon reception of new incremental coded bits—possibly transmitted with a different code rate and/or different modulation order (different MCS) and/or a different time-frequency resource allocation than the initial transmission—the receiving network device 100 may demodulate these new received incremental coded bits and combine them with previously buffered soft coded bits (i.e. the receiving network device 100 may perform soft combining). The combining is done with the objective of providing to the FEC decoder higher quality soft bit inputs, thereby improving the chances that subsequent decoding attempts succeed in completely removing the residual errors.

Once the receiving network device 100 detects—e.g. via CRC check—that the decoded packet is error-free, it may transmit a single-bit ACK feedback to acknowledge the correct reception of the packet. The transmitting network device 110 may therefore stop sending further incremental coded bits for that packet and delete it from the transmission queue.

In an example, the retransmission indication may further comprise an indication of a dynamically determined starting position of the at least one segment of consecutive FEC encoded bits. The processor 102 may be further configured to perform the dynamic determination of the starting position of the at least one segment of consecutive FEC encoded bits based on minimizing sum reliability of segments of consecutive FEC decoded bits stored in a buffer of the receiving network device. Furthermore, the retransmission indication may further comprise an indication of a length of the at least one segment of consecutive FEC encoded bits.

In other words, the transmitting network device 110 may perform the retransmission of the coded bit segments stored in its circular buffer, where the starting position of each segment is dynamically signaled by the receiving network device 100 along with NACK feedback. There is at least one segment in each retransmission, while multiple segments in each retransmission is also possible.

For the $n^{th}$ retransmission, the dynamic starting positions may be determined in the receiving network device 100 by minimizing the sum reliability (5) of the segments of consecutive bits after LDPC decoding, e.g. as in Eq. (6).

The total length P of the segments in the $n^{th}$ retransmission may be obtained according to a given RP (see below), or dynamically signaled by the receiving network device 100 along with the NACK and the dynamic starting position.

As the computation of Eq. (5) for the starting position may be heavy, e.g. the minimization of Eq. (6) may be performed for a suitably chosen subset $\mathcal{S} \subset 1, \ldots, N_{cb}$ of the starting positions, thereby reducing computational complexity and, at the same time, the amount of dynamic feedback from $\log_2 N_{cb}$ to $\log_2 |\mathcal{S}|$. A suitable subset may be determined by picking integer multiples of a step size (granularity) $n_{step}$, thereby obtaining $\mathcal{S} = \{1, 1+n_{step}, 1+2n_{step}, \ldots\}$.

Figure 5:
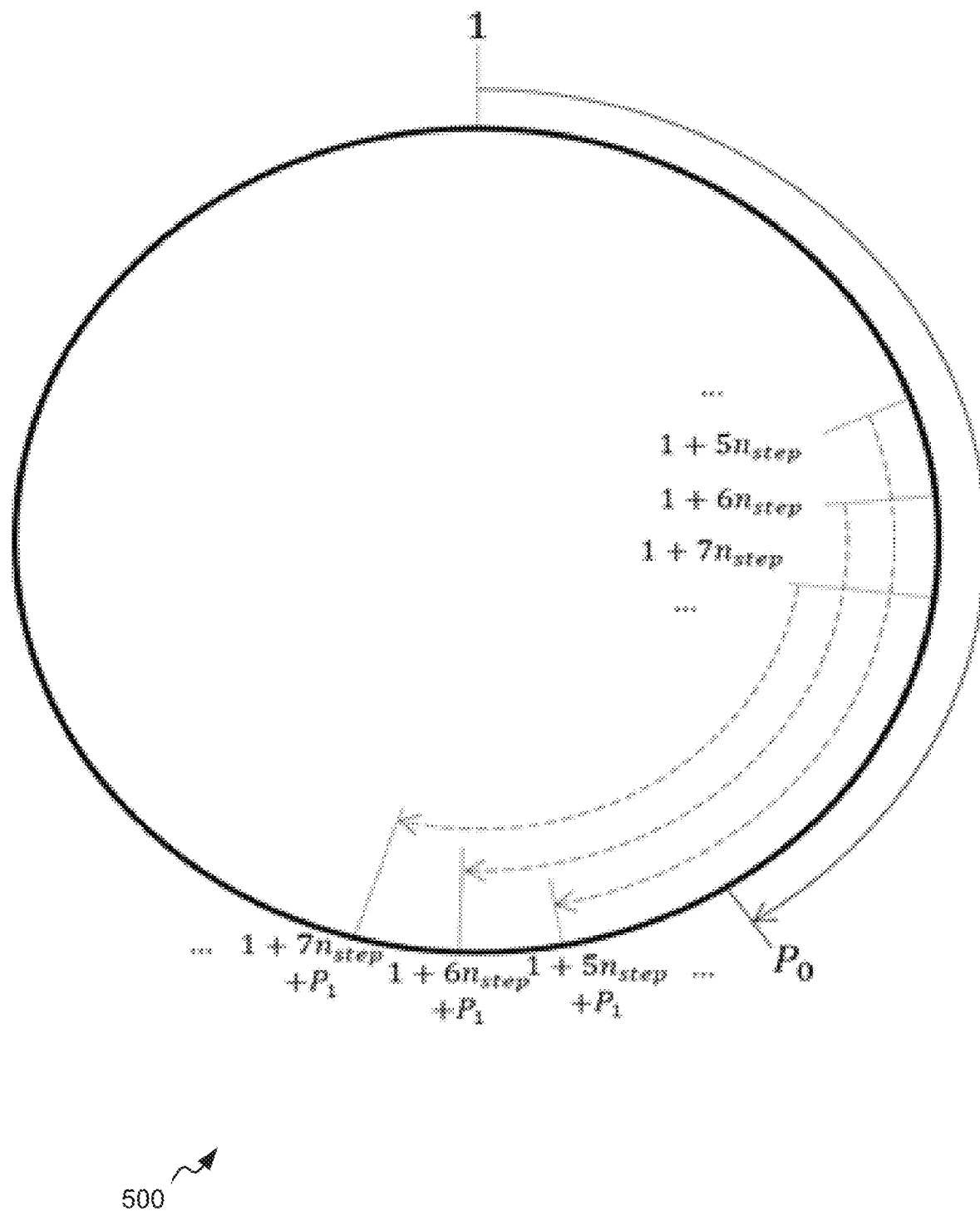
FIG. 5 is a diagram illustrating a soft buffer in a receiving network device according to one exemplary embodiment.

FIG. 5 illustrates a soft buffer 500 of the receiving network device 100 according to one exemplary embodiment, which contains soft received bits arranged in the same order as in the circular buffer of the transmitting network device 110. In FIG. 5, the outer curve corresponds to the soft bits received in the initial transmission, and inner curves correspond to the segments of consecutive bits for evaluation of the sum reliability. In the case of an initial transmission failure, segments of consecutive bits of length $P_1$ may be considered for the sum reliability computation. The total number of segments is $\lceil N_{cb}/n_{step} \rceil$ and the corresponding amount of feedback is $\log_2 \lceil N_{cb}/n_{step} \rceil$, which is considerably smaller than the overhead of Eq. (1). When $n_{step} > 1$, the overhead becomes comparable to NR overhead (up to 8 bits) as shown in the evaluation results below.

An example use case for the example of the retransmission indication comprising the indication of the dynamically determined starting position of the at least one segment of consecutive FEC encoded bits involves NR PUSCH HARQ transmission. Conventional HARQ does not provide any indication to a transmitter about which coded bits to retransmit. Instead, retransmissions are done according to predefined/specified patterns for coded bit selection. However, according to the present application, the receiving network device 100 may send a NACK to the transmitting network device 110 along with an indication of which bits to retransmit. That indication may comprise starting positions and optionally length(s) of one/multiple segments in the circular buffer of the transmitting network device 110. If needed, each NACK bit may be associated with a starting position that is predefined or preconfigured, to reduce signaling overhead.

In an example, the transceiver 101 may be further configured to receive the HARQ retransmissions based on a predetermined retransmission profile. The retransmission profile comprises retransmission occasion (i.e. 1st retransmission, 2nd retransmission, 3rd retransmission, etc.) specific segment length indicators. In an example, at least one retransmission occasion specific segment length indicator in the retransmission profile may provide indication for a shorter retransmission segment than the first HARQ transmission segment. In an example, the processor 102 may be further configured to determine the segment length of the at least one segment of consecutive FEC encoded bits based on the predetermined retransmission profile and the length of the first HARQ transmission occasion.

In other words, the retransmission profile (RP) may be defined as a sequence of N positive real numbers R=[$r_1$, $r_2$, . . . , $r_N$], where r=$P_n/P_0$ is a normalized length of the $n^{th}$ retransmission, $P_0$ is the length [bits] of the initial transmission, $P_n$ is the length [bits] of the $n^{th}$ retransmission and N is the maximum number of retransmissions. The initial transmission rate $R_0$ may be selected based on the channel quality information (CQI) that the receiving network device 100 feeds back to the transmitting network device 110 e.g. through a feedback link. The value P is chosen so that $P_0R_0$=k [bits]. The initial transmission may send P coded bits by sequentially reading a segment of consecutive bits from the circular buffer starting from position $l_0$=1.

Given the initial transmission length $P_0$, the RP determines the number of coded bits in each retransmission. In an example, based on performance evaluation of HARQ schemes with NR LDPC codes over all the rates and modulation orders, a predefined and fixed retransmission profile with N=3 retransmissions R=[$r_1$, $r_2$, $r_3$] may be used, defined as $$R=[r_0-\Delta, r_0+x, r_0+(\Delta-x)] \quad (7)$$

with 0<$\Delta$<$r_0$ and 0≤x≤$\Delta$. Here, $r_0$=1 is the normalized length of the initial transmission. In Eq. (7), the length of the first retransmission is smaller than the initial transmission. If in the initial transmission almost all the transmitted coded bits are successfully decoded (i.e. mostly ACK), the total number of coded bits in the first retransmission may be reduced to increase the SE, as shown by Eq. (7).

On the other hand, for the regions where all the transmitted coded bits are not successfully decoded, (i.e. both ACK and NACK), SE depends both on the actual size of the retransmission and the average number of coded bits per successfully decoded message. In this case, it may be beneficial to increase the size of the second and third retransmissions, as shown by Eq. (7).

In Eq. (7), it is enforced that the total number of transmitted coded bits in four transmissions (N=3) are equal to (N+1)$P_0$. (N+1)$P_0$ is the total number of transmitted coded bits in an NR scenario where all the transmissions have fixed $P_0$ coded bits. In a more general context, R may be defined as:

$$R=[r_1, r_2, r_3] \quad (8)$$

with $r_1$<1 and $r_2$>1 and $r_3$≥1.

In an example, a predefined unique retransmission profile may be used for all retransmissions. The RP may be known to both the transmitting network device 110 and the receiving network device 100.

As a non-uniform RP is the same for all MCSs and target BLERs, the RP may be captured in the specification. Alternatively, the network may semi-statically configure the RP in client devices. Then RP may be dynamically switched on/off e.g. by L1 signaling in the initial transmission.

Alternatively, fixed starting positions L=[$l_1$, $l_2$, . . . $l_N$] in the circular buffer may be used for retransmissions, such that for the $n^{th}$ retransmission, consecutive coded bits may be selected in the circular buffer. The $n^{th}$ retransmission segment has starting position $l_n$ and length $P_n=r_nP_0$, determined according to a predetermined RP.

In this case, since the starting positions $l_n$ for each retransmission may be predefined, a single NACK feedback bit may be enough to request the retransmission. The transmitting network device 110, upon reception of the NACK or alternatively an implicit NACK (defined above), may pick the next starting position and code block length according to the predefined sequence.

A single RP may be predefined for all the MCS and all the SNR values in a given range.

Both the receiving network device 100 and the transmitting network device 110 may be aware of the RP and use it when needed. This means that the re-transmission profile can be configured semi-statically (e.g. by L2 signaling) in both the transmitting network device 110 and the receiving network device 100 prior to communication. Then, when the retransmission happens, both the receiving network device 100 and the transmitting network device 110 may use the configured RP.

An example use case for the example of the retransmission profile involves PUSCH retransmissions within a bundle for PUSCH. PUSCH transmission(s) in NR can be dynamically scheduled by an UL grant in a DCI known as dynamic grant, or semi-statically configured to operate upon reception of a higher layer parameter of "UL-TWG-type1" without the detection of an UL grant in a DCI (e.g. grant-free transmission) known as a configured grant, or even semi-persistently scheduled by an UL grant in a DCI after the reception of higher layer parameter of "UL-TWG-type2".

In the NR, an UL HARQ process determines a mode in which the retransmission parameters (resource allocation, MCS) are the same for the initial transmission and for any retransmissions inside a bundle. Here, the bundle is an assignment/grant spanning a set of transmissions for the same transport block (TB).

That is, the bundle contains all the transmissions during which a single HARQ process is used. For a bundle triggered with dynamic grant, the number of transmissions of a TB within that bundle is configured using RRC parameter "pusch-AggregationFactor". When a semi-statically RRC-configured grant is used, instead of "pusch-AggregationFactor" an RRC configured parameter called "repK" is used to indicate the number of TB transmissions within that bundle.

Within a bundle, retransmissions are triggered without waiting for feedback from previous transmissions. Each transmission within a bundle is a separate uplink grant after the initial uplink grant within a bundle is delivered to the HARQ entity.

Conventionally, retransmissions are performed on the resources and, if provided, with the MCS indicated on PDCCH, or on the same resource and with the same MCS as was used for last made transmission attempt within a bundle.

Using the same resource allocation and the same MCS yields that the RP of that HARQ process is constantly [1, 1, 1]. As shown in the performance evaluation below, using a RP in accordance with Eq. (7) provides advantages in terms of increased SE.

Within a bundle of a configured grant, resource allocation, MCS and redundancy version are configured by higher layer signalling.

Within a bundle of a dynamic grant, redundancy version, modulation order and coding rate for re-transmission are read from a dynamic DCI that occurs inside the bundle. Thus, in an example, the usage of a semi-statically configured retransmission profile for retransmission may be activated by using a reserved field of an MCS table by using the DCIs that are coming inside a bundle.

In a DL example (in which the receiving network device 100 comprises a client device), the transceiver 101 may be further configured to receive a differential resource allocation indication for the requested retransmission. In an UL example (in which the receiving network device 100 comprises a network node device), the transceiver 111 may be further configured to send a differential resource allocation indication for the requested retransmission. The differential resource allocation indication indicates resource allocations to be added or removed with respect to the initially received HARQ transmission.

In other words, using the retransmission profile allows using shortened DCIs for scheduling of PDSCH or PUSCH retransmissions. In the current NR specification, DCI formats 0-0, 0-1 are used to schedule PUSCH transmissions and DCI formats 1-0, 1-1 are used to schedule PDSCH transmissions. These DCI formats have a frequency domain resource assignment (RA) field that contains a bitmap indicating resource block groups (i.e. RBGs) (RA type 0), or a set of contiguously allocated resource blocks (i.e. RBs) (RA type 1), that are allocated to the scheduled client device. Each RBG contains P RBs, where P depends on bandwidth part (BWP) size.

In the DL, the RA field indicates to a UE which RBs/RBGs have been used by the network node device for transmission of the TB for that client device. In the UL, the RA field indicates to a client device which RBGs it can use for the transmission of a TB.

For RA type 0, the RA field size is $$\left\lceil \frac{N^{BWP} + (N^{BWP} \bmod P)}{P} \right\rceil \text{ bits,}$$

where $N^{BWP}$ is the number of RBs in the active bandwidth part (BWP) used for transmission. For RA type 1, the RA field size is $$\lceil \log_2(N^{BWP}(N^{BWP} + 1)/2) \rceil \text{ bits.}$$

In NR, the RA field is transmitted in the DCI that schedules the initial transmission and in the DCIs that schedule retransmissions. Given the number of RBs/RBGs in a RA and the modulation order (signalled along with RA in the MCS field of the same DCI), the number of coded bits that the RA is able to accommodate can be straightforwardly computed. Thus, by changing the number of allocated RBGs and/or the modulation order, any gNB can already obtain any arbitrary RP (up to RB-/RBG-level granularity).

As NR currently does not specify any retransmission profile, signaling the number of coded bits in each transmission (by means of the RA/MCS pair) is an exemplary feature. However, the size of the RA field in the DCI may be large. Large DCIs may increase control channel/PDCCH traffic and tend to generate control channel congestion, thereby being potentially harmful for low-latency transmissions. The examples involving the differential resource allocation indication may be used to alleviate this, as discussed below.

In a first example of RA signaling, a client device uses the RA indication in the DCI scheduling initial transmission (initial RA) to determine a corresponding RBs/RBGs assignment for the initial transmission. When a retransmission is needed, the transmitting network device 110 signals a differential RA. In order to determine the RBs/RBGs used in the $n^{th}$ retransmission, the receiving network device 100 may use the initial RA and the $n^{th}$ differential RA. Each differential RA indicates a set of RBs/RBGs to be added to or removed from the initial RA.

Figure 6A:
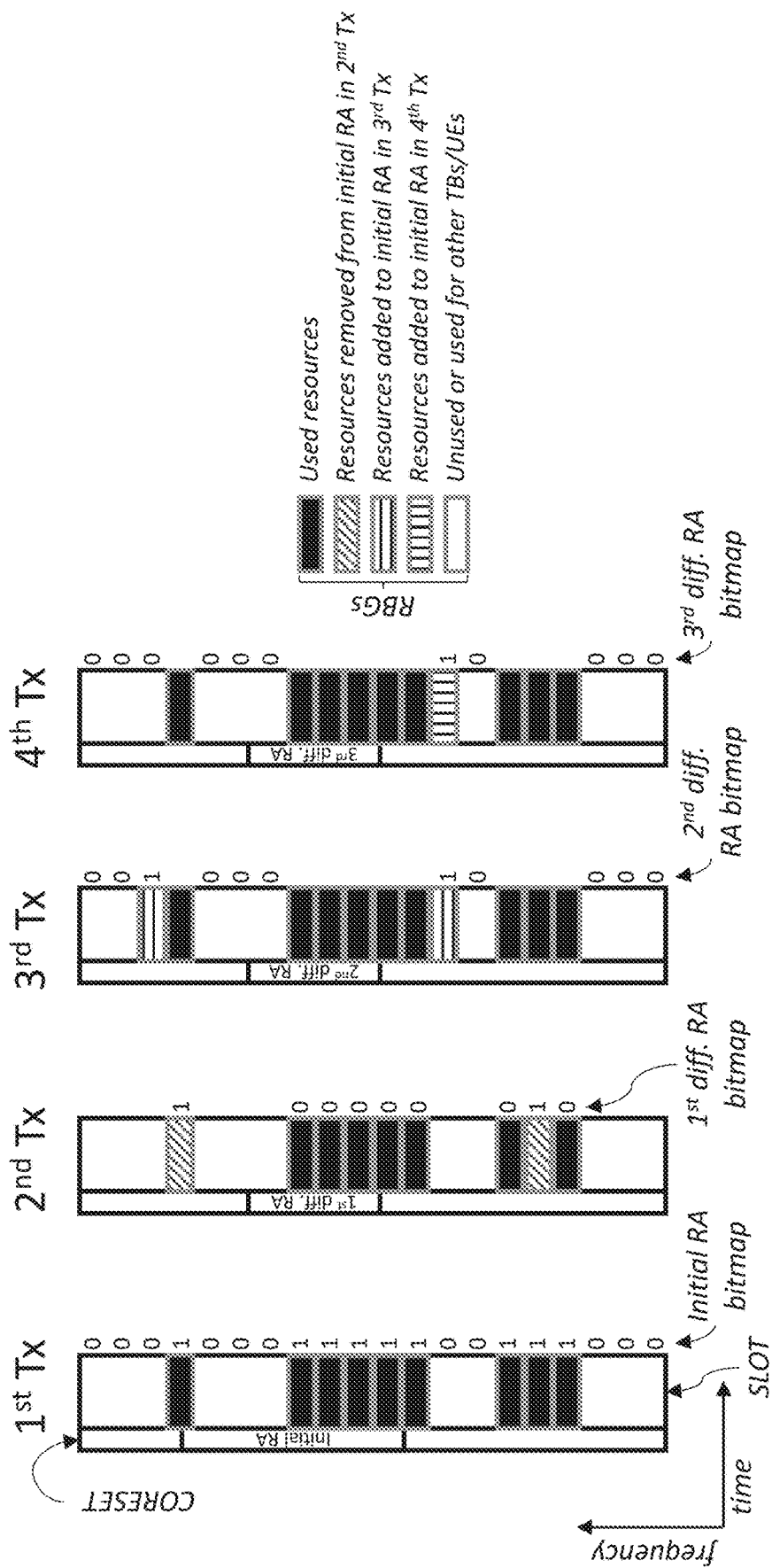
FIGS. 6A to 6E are diagrams illustrating signaling of resource assignment according to exemplary embodiments.

An example using type 0 RA: an initial RA of type 0 consists of a bitmap of allocated RBGs (shown in black in diagram 610 of FIG. 6A illustrating differential RA indication with RA type 0 indication). The corresponding bitmap is labelled in FIG. 6A as "initial RA bit field" and comprises 20 bits. A '1' in the bitmap indicates that the corresponding RBG is used. A '0' in the bitmap indicates that the corresponding RBG is not used.

It is assumed in this example that the 2nd transmission is shorter than the 1st transmission. Thus, a type 0 differential RA in the DCI that schedules the 2nd transmission is used to indicate which RBGs to remove from the initial RA in order to obtain the RA for the 2nd transmission. That bitmap is labelled in FIG. 6A as "1st diff RA bit field" and comprises 9 bits—much less than the 20 bits that would be needed using a conventional RA indication. Thus, a significant reduction of RA field size is obtained for the 2nd transmission.

It is further assumed in this example that the 3rd transmission is longer than the 1st transmission. Thus, a type 0 differential RA in the DCI that schedules the 3rd transmission is used to indicate which RBGs to add to the initial RA in order to obtain the RA for the 3rd transmission. That bitmap is labelled in FIG. 6A as "2nd diff RA bit field" and comprises 11 bits—much less than the 20 bits that would be needed using a conventional RA indication. Thus, a significant reduction of RA field size is obtained for the 3rd transmission.

For the 4th transmission, it is proceeded in the same way as for the 3rd transmission, thereby obtaining a similar RA field size reduction.

An example using type 1 RA: an initial RA of type 1 comprises a resource indication value (RIV) of size $$\left\lceil \log_2\left(\frac{N_{BWP}(N_{BWP} + 1)}{2}\right) \right\rceil,$$

where $N_{BWP}$ is the number of RBs in the bandwidth part (BWP). When the number of consecutive allocated RBs $L_{RB}$ is less than or at the most equal to $\lfloor N_{BWP}/2 \rfloor$, then RIV is computed as $N_{BWP}(L_{RB}-1)+RB_{start}$, where $RB_{start}$ is the index of the starting RB in the contiguous allocation.

Figure 6B:
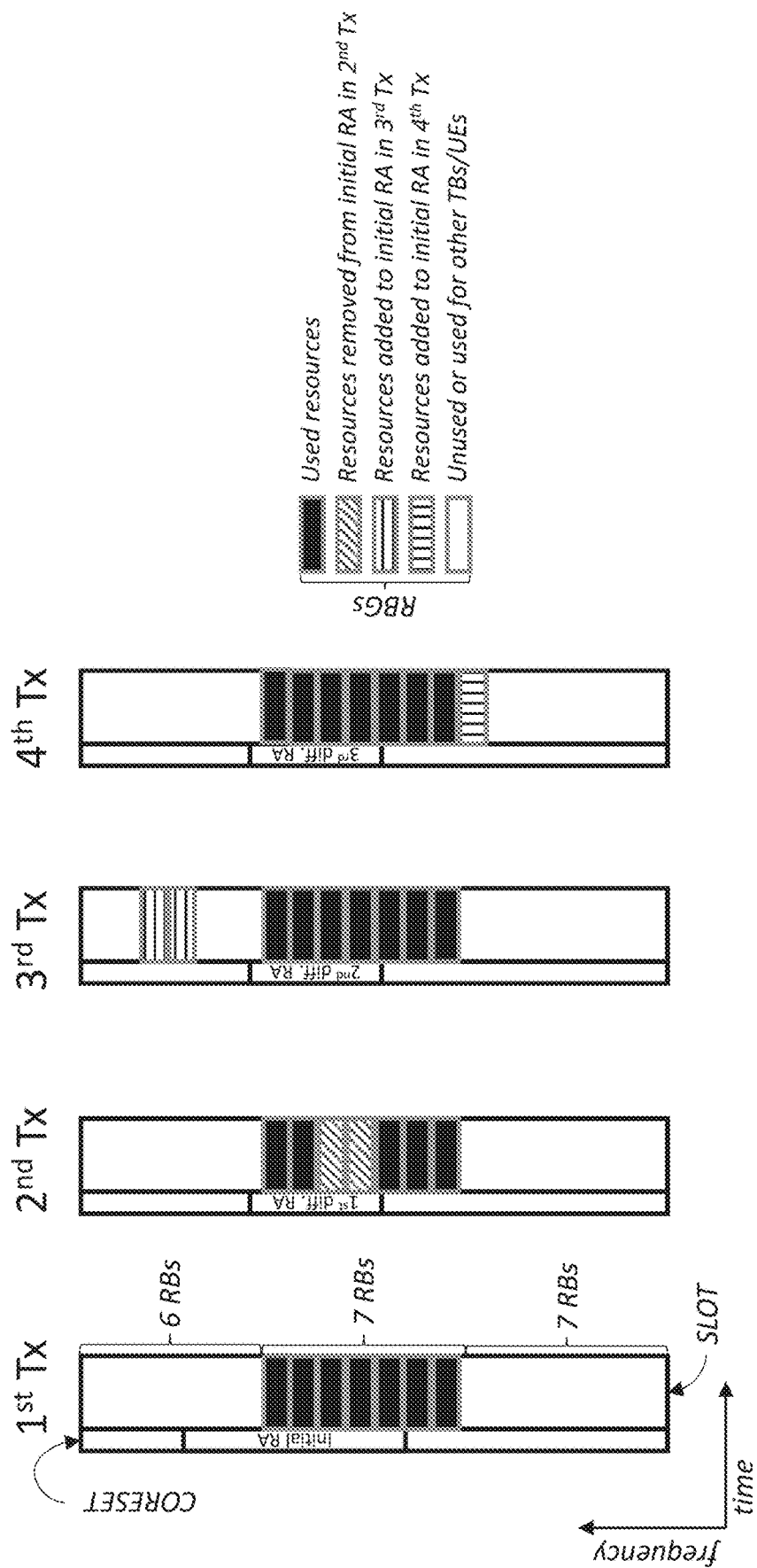

This example assumes that $N_{BWP}=20$ and $L_{RB}^{(1)}=7$ for initial allocation (see diagram 620 of FIG. 6B illustrating differential RA indication with RA type 1 indication, 1st Tx). The size of RA field in the initial transmission is 8 bits.

This example further assumes that the 2nd transmission is shorter than the 1st transmission. Thus, a type 1 differential RA in the DCI that schedules the 2nd transmission is used to indicate which RBGs to remove from the initial RA in order to obtain the RA for the 2nd transmission. The initial resource allocation is now regarded as the bandwidth part for the computation of the differential RA. The RIV for differential RA is computed taking the initial resource allocation as the reference as $L_{RB}^{(1)}(L_{RB}^{(2)}-1)+RB_{start}^{(2)}$, where $L_{RB}^{(2)}$ is the number of consecutive allocated RBs in the 2nd transmission. This example assumes that $L_{RB}^{(2)}=2$ (see FIG. 6B, 2nd Tx). The size of the differential RA field in the 2nd transmission is 5 bits.

This example further assumes that the 3rd transmission is longer than the 1st transmission. Thus, a type 1 differential RA in the DCI that schedules the 3rd transmission is used to indicate which RBGs to add to the initial RA in order to obtain the RA for the 3rd transmission. The unused RBs in the initial RA are now regarded as a consecutive bandwidth part for the computation of the differential RA. The RIV for differential RA is computed as $(N_{BPW}-L_{RB}^{(1)})(L_{RB}^{(3)}-1)+RB_{start}^{(3)}$. As a result, the size of the differential RA field in the 3rd transmission is 7 bits.

For the 4th transmission, it is proceeded in the same way as for the 3rd transmission, thereby obtaining a similar RA field size reduction.

Type 0 RA and type 1 RA can be arbitrarily combined so as to obtain hybrid initial/differential signaling solutions.

The above examples with differential RA indication do not have a semi-statically configured RP, as any arbitrary RP can be dynamically obtained by a suitable indication of the initial RA (in the initial transmission) and subsequent differential indication of RAs. However, it may be necessary to indicate for each retransmission whether the RBGs in the corresponding differential RA are added to or removed from the initial RA. That indication is one additional bit for each retransmission and can be provided to the client device with semi-static configuration.

The above examples with differential RA indication are advantageous as differential RAs are typically smaller than a conventional RA, and thus the size of corresponding control messages is shorter.

In a second example of RA signaling, an initial RA allocates a number of RBs/RBGs large enough to accommodate the largest number of coded bits/modulation symbols in any transmission/retransmission of a given TB. The largest number of coded bits is determined according to the RP as $$\max_{n=0,\ldots,N}(P_n).$$

In each transmission/retransmission, the transmitting network device 110 fills all the RBs/RBGs indicated in the initial RA or part of the RBs/RBGs as indicated in the RP. The unused resources can be reused for other TBs/client devices.

Figure 6C:
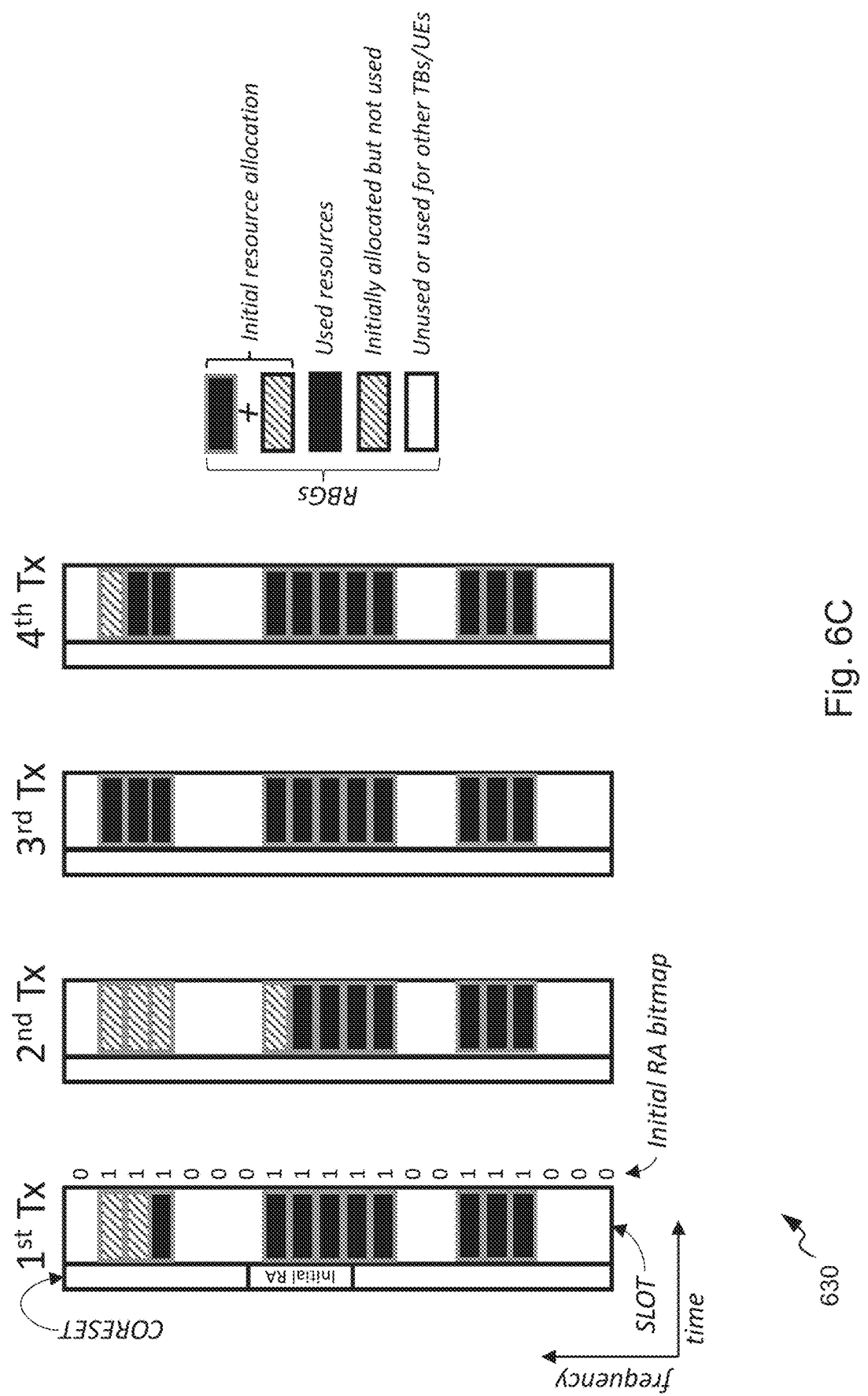

An example using retransmission scheduling without RA indication (FIG. 6C (retransmission scheduling without RA indication with initial RA indication type 0), 6D (retransmission scheduling without RA indication with initial RA indication type 1)) The initial RA is signaled in the RA field of the DCI that schedules initial transmission. The initial resource allocation is large enough to accommodate the largest among all transmission (the 3rd transmission in diagram 630 of FIG. 6C and diagram 640 of FIG. 6D). In each transmission, the transmitting network device 110 starts filling the allocated resources from the lowest frequency indices and proceeds until all the coded bits for the given retransmission (P coded bits, according to the configured RP) have been mapped to REs. The unused RBs/RBGs can be used for other client devices/TBs.

Figure 6D:
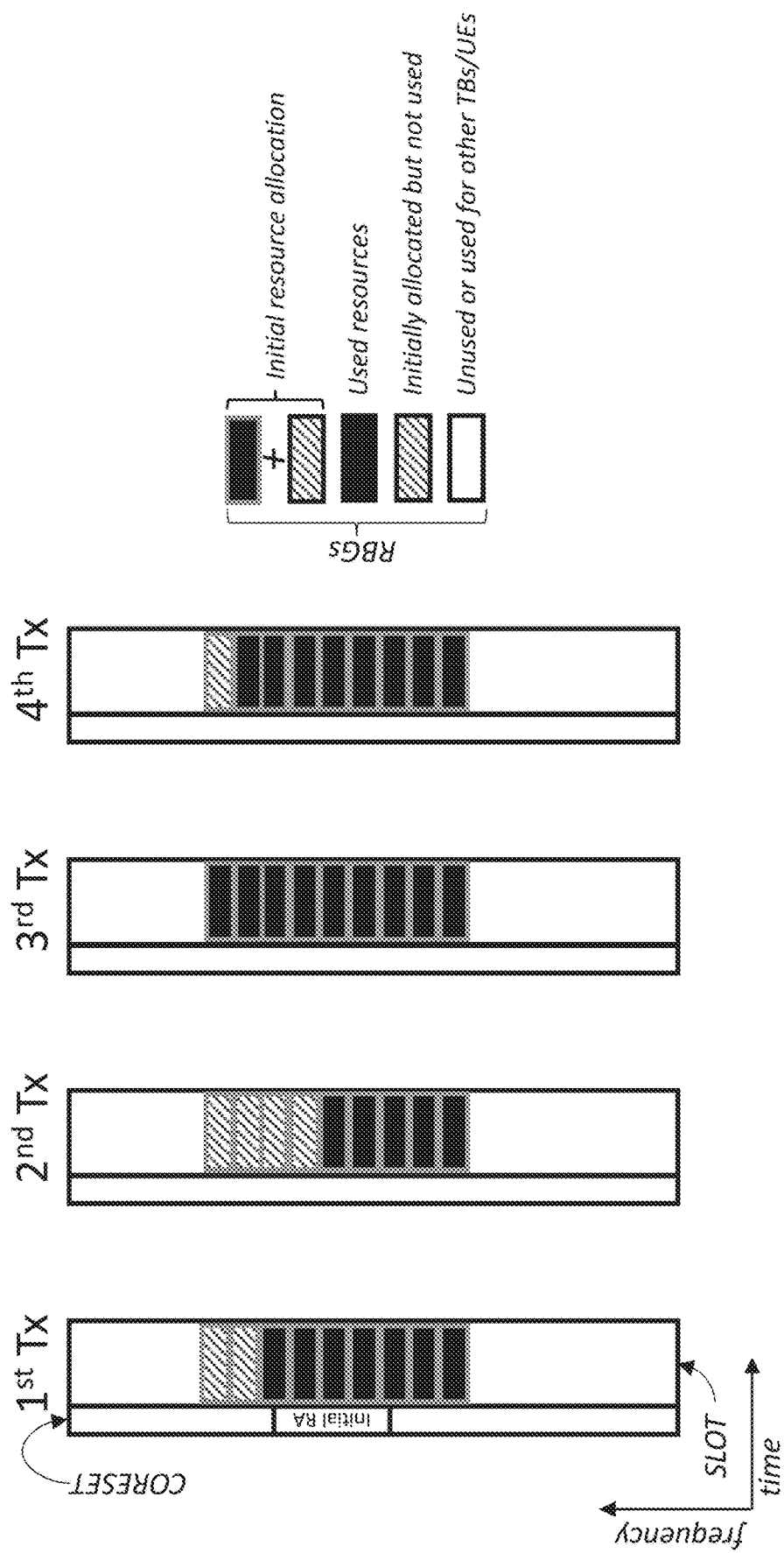
Figure 6E:
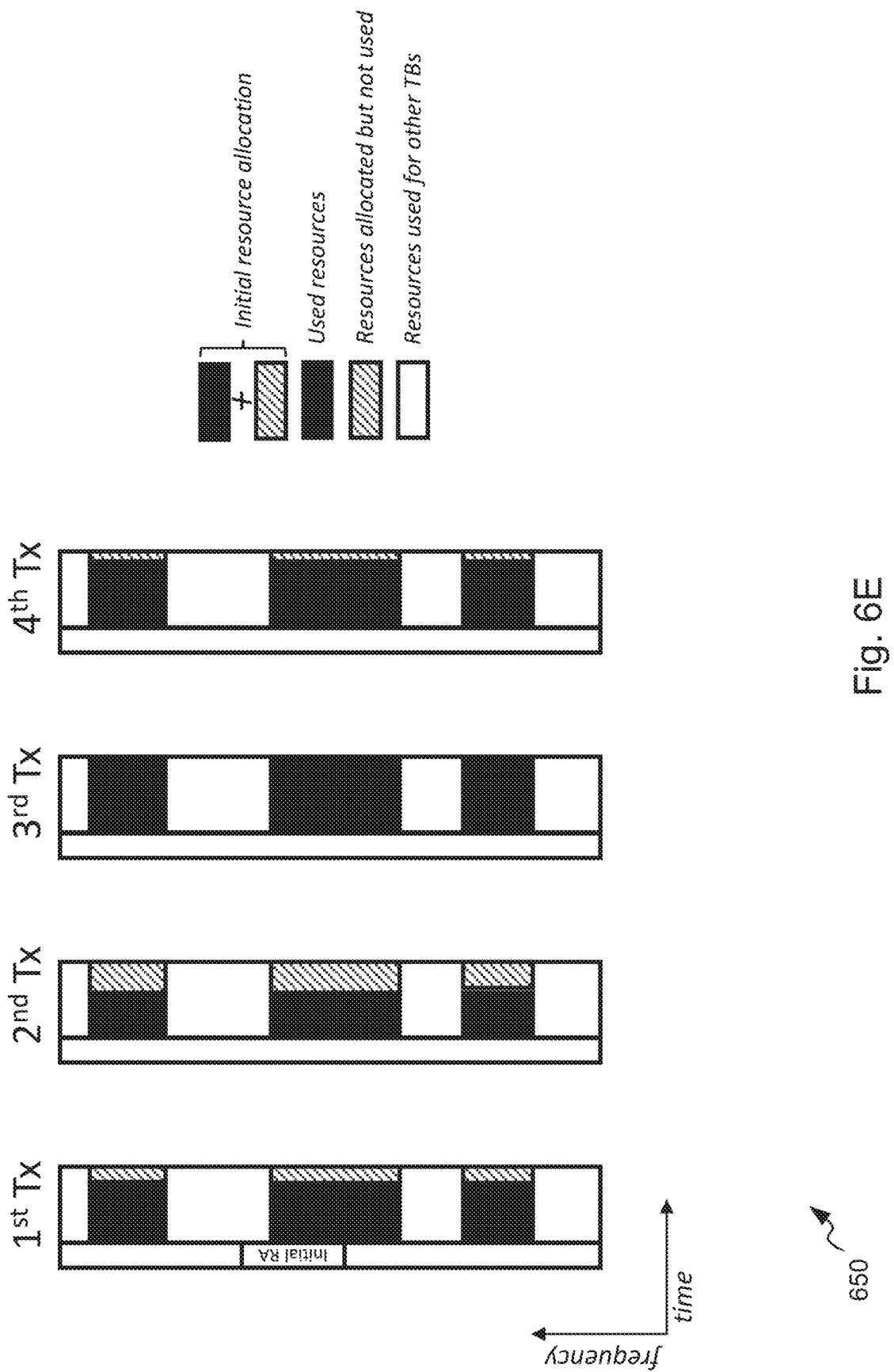

Diagram 650 of FIG. 6E (retransmission scheduling without RA indication with type 1 RA and frequency-first information mapping) shows a similar case as FIG. 6D, but now with frequency-first information mapping. Here, in each transmission the transmitting network device 110 starts filling the allocated resources from the lowest time indices and proceeds until there are coded bits to send. The RB/RBG symbols left empty by this data message can be reused for other transmissions. For example, NR URLLC transmissions are designed to be overlapped in time/frequency with enhanced mobile broadband (eMBB) transmissions. A URLLC transmission can preempt resources allocated to an ongoing eMBB transmission and use them for its own data. In such a case, a preemption indication may be issued to the receiving network device 100. With the disclosed example, the unused symbols in a given eMBB (re)transmission may be used for URLLC transmissions without any eMBB preemption occurring.

For each of the cases mentioned above, the receiving network device 100 may monitor one additional DCI size/format.

In another example differing from the above examples, the transmitting network device 110 may perform the retransmission of coded bits according to error-prone patterns of a linear FEC code. Error-prone patterns are those bit-error patterns that appear more frequently in the decoded code word when a decoding error occurs. Error-prone patterns can be found for any linear code, for example in binary LDPC codes.

An error-prone pattern $e \subset \{1, \ldots, N_{cb}\}$ is a subset of the circular buffer indices that corresponds to a frequent bit-error sequence. Common error-prone patterns for any linear code include code words having a minimum or low Hamming weight. More specifically, the error-prone patterns are related to the type of code and decoding algorithm. Error-prone substructures for LDPC codes under Belief-Propagation (BP) decoding are called stopping/trapping sets.

Given a common table containing Np error-prone patterns (known to the transmitting network device 110 and the receiving network device 100), the receiving network device 100 may evaluate the sum reliability of each of the error-prone patterns and determine a subset $\mathcal{P} \subset \{1, \ldots, N_P\}$ of patterns with minimum sum reliability or whose sum reliability is below a given threshold. Then, along with NACK, the receiving network device 100 may dynamically feedback the table indices in $\mathcal{P}$ to the transmitting network device 110. Upon reception of the NACK with the error pattern indication, the transmitting network device 110 may retransmit the coded bits indicated by the signaled patterns.

The amount of feedback needed for dynamic signaling of the error prone patterns may be defined as:

$$n_f = \left\lceil \log_2\left(\frac{N_P}{|\mathcal{P}|}\right) \right\rceil.$$

Similar to other examples herein, a RP can help to determine the maximum number of coded bits that can be accommodated in each retransmission. Thus, given the number of coded bits $P_n$ for the $n^{th}$ retransmission, the receiving network device 100 may select for retransmission the error-prone patterns $e_i$ having smaller sum reliabilities subject to a constraint on the total number of coded bits:

$$\bigcup_{i \in \mathcal{P}} e_i \leq P_n \quad (9)$$

When the number of coded bits in the selected subset of error prone patterns $\mathcal{P}$ is strictly less than $P_n$, Eq. (9) holds with inequality.

If adding one more error prone pattern in $\mathcal{P}$ would violate Eq. (9), then that pattern cannot be added to $\mathcal{P}$ as the transmitting network device 110 would receive indication to retransmit more than $P_n$ coded bits, which there might be no room for.

The transmitting network device 110 that receives an indication of less than $P_n$ bits may decide to repeat some of the feedback-indicated coded bits or other (non-indicated) coded bits in order to fill the $P_n$ resources.

Alternatively, feedback indication of slightly more than $P_n$ coded bits may be allowed—by explicitly violating Eq. (9)—and then the transmitting network device 110 may be allowed to perform down-selection to obtain a set of $P_n$ coded bits for retransmission.

An example use case for the above example of using the error-prone patterns includes NR PUSCH HARQ transmission.

FIG. 1B is a block diagram that illustrates the transmitting network device 110 according to one exemplary embodiment. In an embodiment, the transmitting network device 110 may comprise a network node device that may include e.g. a base station, such as a macro-eNodeB, a pico-eNodeB, a home eNodeB, a fifth-generation base station (gNB) or any such device providing an air interface for client devices to connect to the wireless network via wireless transmissions. In another embodiment, the transmitting network device 110 may comprise a client device that may be any of various types of devices used directly by an end user entity and capable of communication in a wireless network, such as a user equipment (UE). Such devices include but are not limited to smartphones, tablet computers, smart watches, lap top computers, Internet-of-Things (IoT) devices etc. Although embodiments may be described in terms of a client device, it is by way of example and in no way a limitation. In an embodiment in which the transmitting network device 110 of FIG. 1B comprises a network node device, the receiving network device 100 of FIG. 1A comprises a client device, and vice versa.

According to an aspect, the transmitting network device 110 comprises a transceiver 111 and a processor or a processing unit 112 coupled to the transceiver 111, which may be used to implement the functionalities described later in more detail.

The processor 112 may include e.g. one or more of various processing devices, such as a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The transmitting network device 110 may further comprise a memory 113 that is configured to store e.g. computer-executable codes and the like. The memory may include one or more volatile memory devices, one or more non-volatile memory devices, and/or a combination of one or more volatile memory devices and non-volatile memory devices. For example, the memory may be embodied as magnetic storage devices (such as hard disk drives, floppy disks, magnetic tapes, etc.), optical magnetic storage devices, and semiconductor memories (such as mask ROM, PROM (programmable ROM), EPROM (erasable PROM), flash ROM, RAM (random access memory), etc.).

It is to be noted that e.g. the various parameters and pieces of data used by the transmitting network device 110 are identical or at least functionally equivalent to those used by the receiving network device 100 of FIG. 1A so their descriptions are not repeated here in detail.

The transceiver 111 is configured to transmit a hybrid automatic repeat request, HARQ, transmission to the receiving network device 100. As discussed above, the HARQ transmission may comprise at least one segment of consecutive forward error correction (FEC) encoded bits that are stored in a buffer of the transmitting network device (110). The buffer of the transmitting network device 110 may comprise a circular buffer, and it may be comprised e.g. in the memory 113.

The transceiver 111 is further configured to receive a retransmission request comprising a retransmission indication for at least one segment of consecutive forward error correction, FEC, encoded bits stored in the buffer of the transmitting network device 110. In other words, the retransmission request may comprise a retransmission indication for at least one of the transmitted segments of consecutive FEC encoded bits in the transmitted HARQ transmission. The at least one segment of consecutive FEC encoded bits indicated to be retransmitted may correspond with one or more residual errors detected at the receiving network device 100. In an example, the retransmission indication may comprise a negative acknowledgement (NACK) signal.

The processor 112 is configured to determine the at least one segment of consecutive FEC encoded bits stored in the buffer of the transmitting network device 110 to be retransmitted based on the received retransmission indication.

The transceiver 111 is further configured to retransmit the determined at least one segment of consecutive FEC encoded bits to the receiving network device 100.

In an example, the retransmission indication may further comprise an indication of a dynamically determined starting position of the at least one segment of consecutive FEC encoded bits. The retransmission indication may further comprise an indication of a length of the at least one segment of consecutive FEC encoded bits.

In an example, the processor 112 may be further configured to determine a starting position of the at least one segment of consecutive FEC encoded bits based on predetermined starting positions associated with each retransmission occasion (i.e. 1st retransmission, 2nd retransmission, 3rd retransmission, etc.). Furthermore, the processor 112 may be further configured to determine a length of the at least one segment of consecutive FEC encoded bits based on a predetermined retransmission profile. The retransmission profile comprises retransmission occasion specific segment length indicators. In an example, at least one retransmission occasion specific segment length indicator in the retransmission profile may provide indication for a shorter retransmission segment than the first HARQ transmission segment. In an example, the segment length of the at least one segment of consecutive FEC encoded bits is based on the predetermined retransmission profile and the length of the first HARQ transmission occasion.

In a DL example (in which the transmitting network device 110 comprises a network node device), the transceiver 111 may be further configured to send a differential resource allocation indication for the requested retransmission. In an UL example (in which the transmitting network device 110 comprises a client device), the transceiver 111 may be further configured to receive a differential resource allocation indication for the requested retransmission. The differential resource allocation indication indicates resource allocations to be added or removed with respect to the initially received HARQ transmission. The processor 112 may be further configured to adjust resource allocation accordingly for the requested retransmission. In an example, the transceiver 111 may be further configured to receive a resource allocation adjusted to the largest value in the retransmission profile.

Figure 4A:
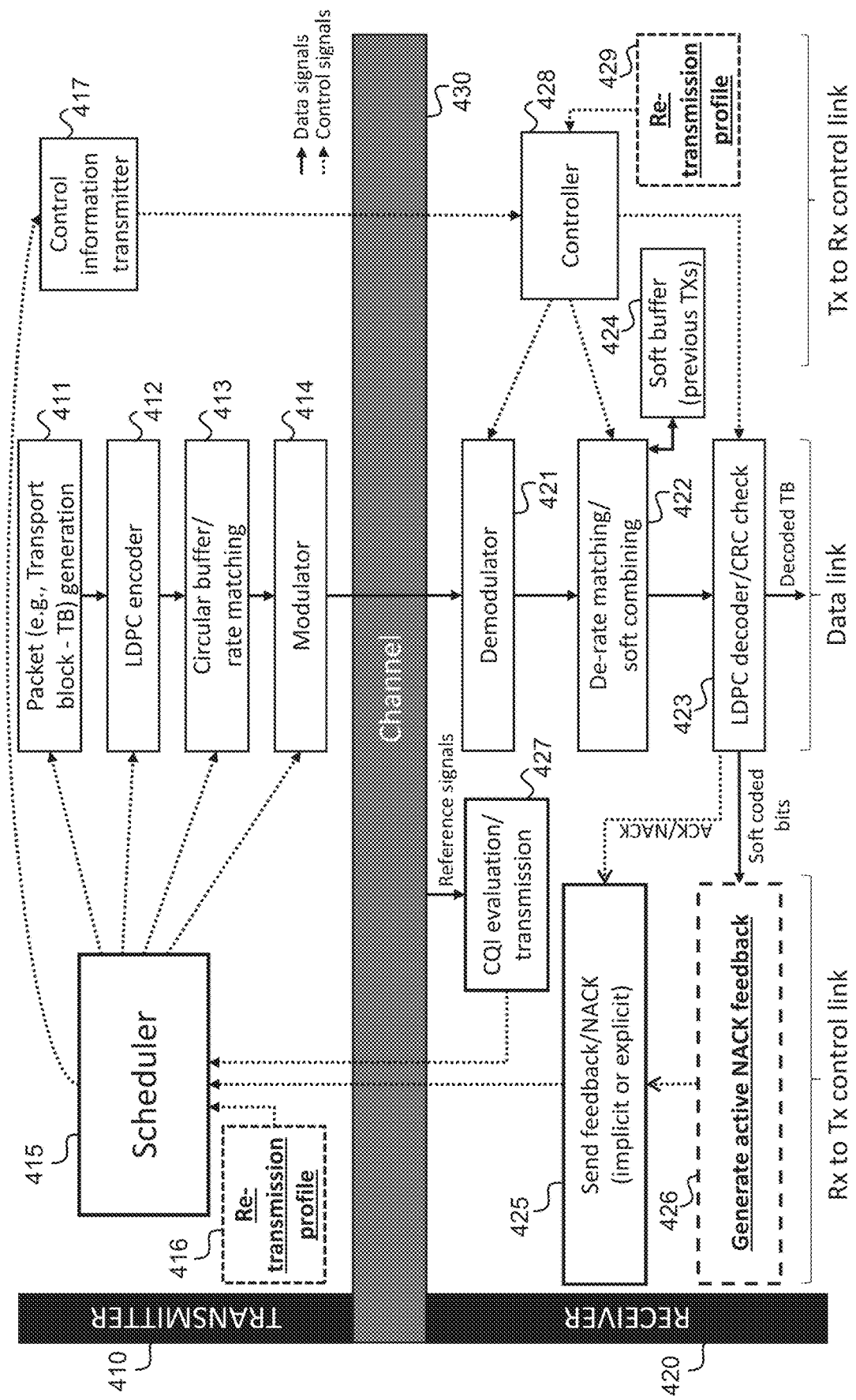
FIG. 4A is a block diagram illustrating a DL system according to one exemplary embodiment.
Figure 4B:
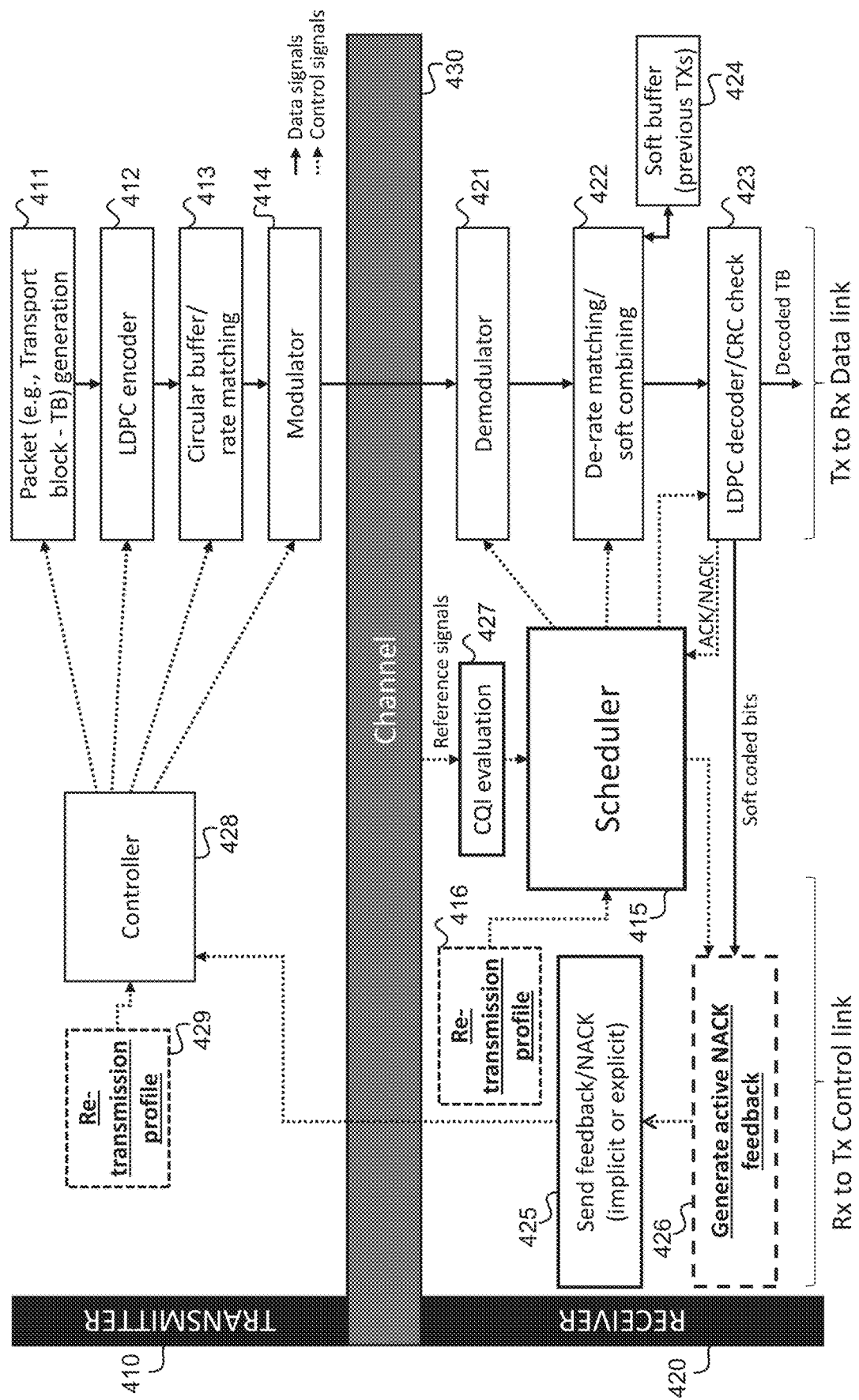
FIG. 4B is a block diagram illustrating a UL system according to one exemplary embodiment.

FIGS. 4A and 4B illustrate example implementations of the receiving network device 100 of FIG. 1A and the transmitting network device 110 of FIG. 1B.

FIG. 4A shows a block diagram 400 applicable to NR downlink according to one exemplary embodiment. The transmitter 410 here corresponds to a network node device (as well as the transmitting network device 110 of FIG. 1B), while the receiver 420 corresponds to a client device (as well as the receiving network device 100 of FIG. 1A). A packet generation block 411 generates a transport block that is used as an input to a LDPC encoder 412. The LDPC encoder 412 in FIG. 4A maps the transport block or a segment thereof to a code word. The code word is written sequentially into a circular buffer shown as a circular buffer/rate matching block 413. The content of the circular buffer is read sequentially and is fed to a modulator 414. In the modulator 414, bits are mapped to symbols and symbols are transmitted over a channel 430.

Upon reception of the transmitted symbols, a receiver demodulator block 421 demodulates a received noisy signal. In the receiver 420, demodulation and de-rate matching/combining 422 are performed in order to obtain soft coded bits corresponding to each of the transmitted coded bits. After FEC decoding (shown as a LDPC decoder block 423), the receiver 420 checks via CRC whether the received packet has some residual errors. If this is the case, the receiver 420 buffers the received soft coded bits in a soft buffer (shown in the FIG. 4A as block 424) and issues a retransmission request (shown as NACK in send NACK block 425) through a feedback link to the transmitter 410. Optionally, there is an Active NACK feedback generator 426 that may generate additional information along with the NACK signal.

If the transmitter 410 (network node device in FIG. 4A) receives a NACK signal, a retransmission is scheduled through a downlink data link, optionally using a retransmission profile 416. If the transmitter 410 receives an ACK signal, no more retransmission is needed.

The scheduler 415 shown in the transmitter 410 (network node device in FIG. 4A) has knowledge of the retransmission profile and may interact with downlink data transmission and control information transmitter 417. The control information transmitter 417 is in charge of sending control information that characterize data transmission (such as modulation order, resource allocation, and/or actual number of retransmissions). This happens prior to data transmission. Optionally the control information transmitter 417 may send information about the retransmission profile 416, if needed, prior to the data transmission. Alternatively, the control information transmitter 417 may configure the retransmission profile 416 prior to the actual data transmission using semi-static signaling. CQI (Channel Quality Information) evaluation/transmission block 427 is in charge of sending channel quality information obtained in the receiver 420 (client device in FIG. 4A). The controller 428 may correspond e.g. with the controller 303 of FIG. 3.

FIG. 4B shows a block diagram 450 applicable to NR uplink according to one exemplary embodiment. The transmitter 410 here corresponds to a client device (as well as the transmitting network device 110 of FIG. 1B) while the receiver 420 corresponds to a network node device (as well as the receiving network device 100 of FIG. 1A). Different blocks shown in data link block diagram including TB generator 411, LDPC encoder 412, circular buffer/rate matching 413, modulator 414, demodulator 421, de-rate matching/soft combining 422 and LDCP decoder/CRC check 423 have the same functionality and input/output as in FIG. 4A, so their descriptions are not repeated here in detail. The functionality of blocks presented in Rx to Tx control link (including the optional generate active NACK feedback 426 and NACK generator 425) is similar to FIG. 4A, so their descriptions are not repeated here in detail. Similarly, scheduler 415, controller 428, retransmission profiles 416, 429, CQI evaluation/transmission 427, soft buffer 424, and channel 430 correspond with their counterparts in FIG. 4A.

Figure 2A:
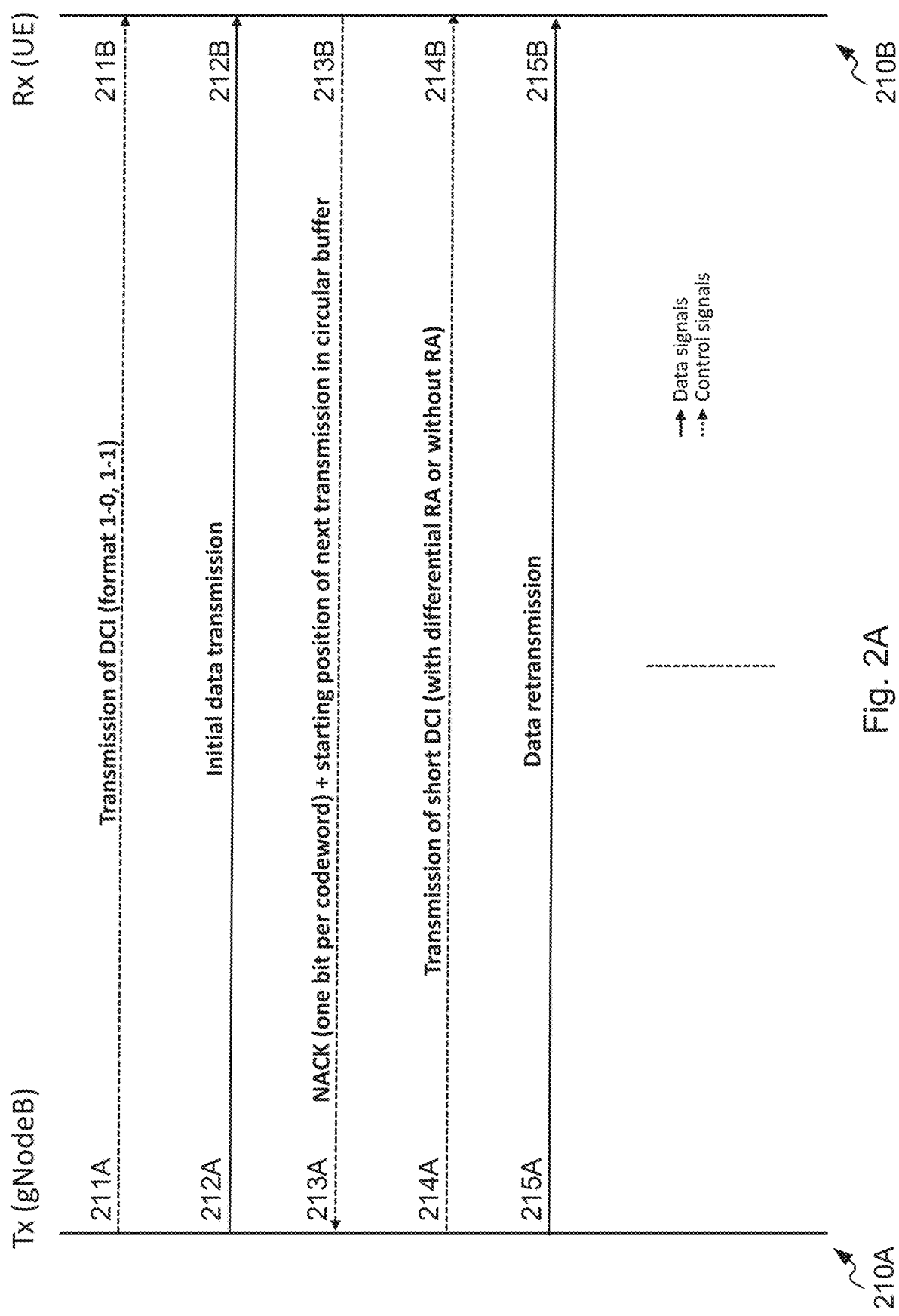
FIG. 2A is a signaling diagram illustrating a method according to one exemplary embodiment.

FIG. 2A is a signaling diagram illustrating methods 210A and 210B in DL data transmission according to an embodiment. The method 210A relates to the transmitting end functionality, and the method 210B relates to the receiving end functionality. In this example, the transmitting network device comprises a network node device, and the receiving network device comprises a client device.

At operation 211A, a downlink control information, DCI, transmission comprising control information for a subsequent HARQ transmission is transmitted from the transmitting network device. At operation 211B, the DCI transmission is received at the receiving network device. The DCI transmission is e.g. of the format 1-0, 1-1.

At operation 212A, a hybrid automatic repeat request, HARQ, transmission (also referred to as initial data transmission herein) is transmitted from the transmitting network device. At operation 212B, the HARQ transmission is received at the receiving network device. One or more residual errors in the received HARQ transmission are detected by the receiving network device.

At operation 213B, the receiving network device sends a retransmission request that comprises a retransmission indication for at least one segment of consecutive forward error correction, FEC, encoded bits stored in a buffer of the transmitting network device. The at least one segment of consecutive FEC encoded bits indicated to be retransmitted may correspond with the detected one or more residual errors. The at least one segment of consecutive FEC encoded bits to be retransmitted may be determined based on the received control information.

The retransmission indication may comprise a negative acknowledgement, NACK, signal (e.g. one bit per code word). Here, the retransmission indication may further comprise an indication of a dynamically determined starting position of the at least one segment of consecutive FEC encoded bits, i.e. a starting position in a circular buffer of the transmitting network device for the indicated retransmission. The retransmission indication may further comprise an indication of a length of the at least one segment of consecutive FEC encoded bits. At operation 213A, the retransmission request is received at the transmitting network device. Based on the received retransmission indication, the transmitting network device determines the at least one segment of consecutive FEC encoded bits stored in the buffer of the transmitting network device to be retransmitted.

At optional operation 214A, the transmitting network device sends a short DCI, optionally with a differential resource allocation indication for the requested retransmission, or without a resource allocation indication. The differential resource allocation indication indicates resource allocations to be added or removed with respect to the initially received HARQ transmission. At optional operation 214B, the short DCI is received at the receiving network device. Resource allocation is adjusted accordingly for the requested retransmission.

At operation 215A, the determined at least one segment of consecutive FEC encoded bits (i.e. data) is retransmitted from the transmitting network device. At operation 215B, the data retransmission is received at the receiving network device.

The method 210A may be performed by the transmitting network device 110. Further features of the method 210A directly result from the functionalities of the transmitting network device 110. The method 210A can be performed by computer-executable codes. The method 210B may be performed by the receiving network device 100. Further features of the method 210B directly result from the functionalities of the receiving network device 100. The method 210B can be performed by computer-executable codes.

Figure 2B:
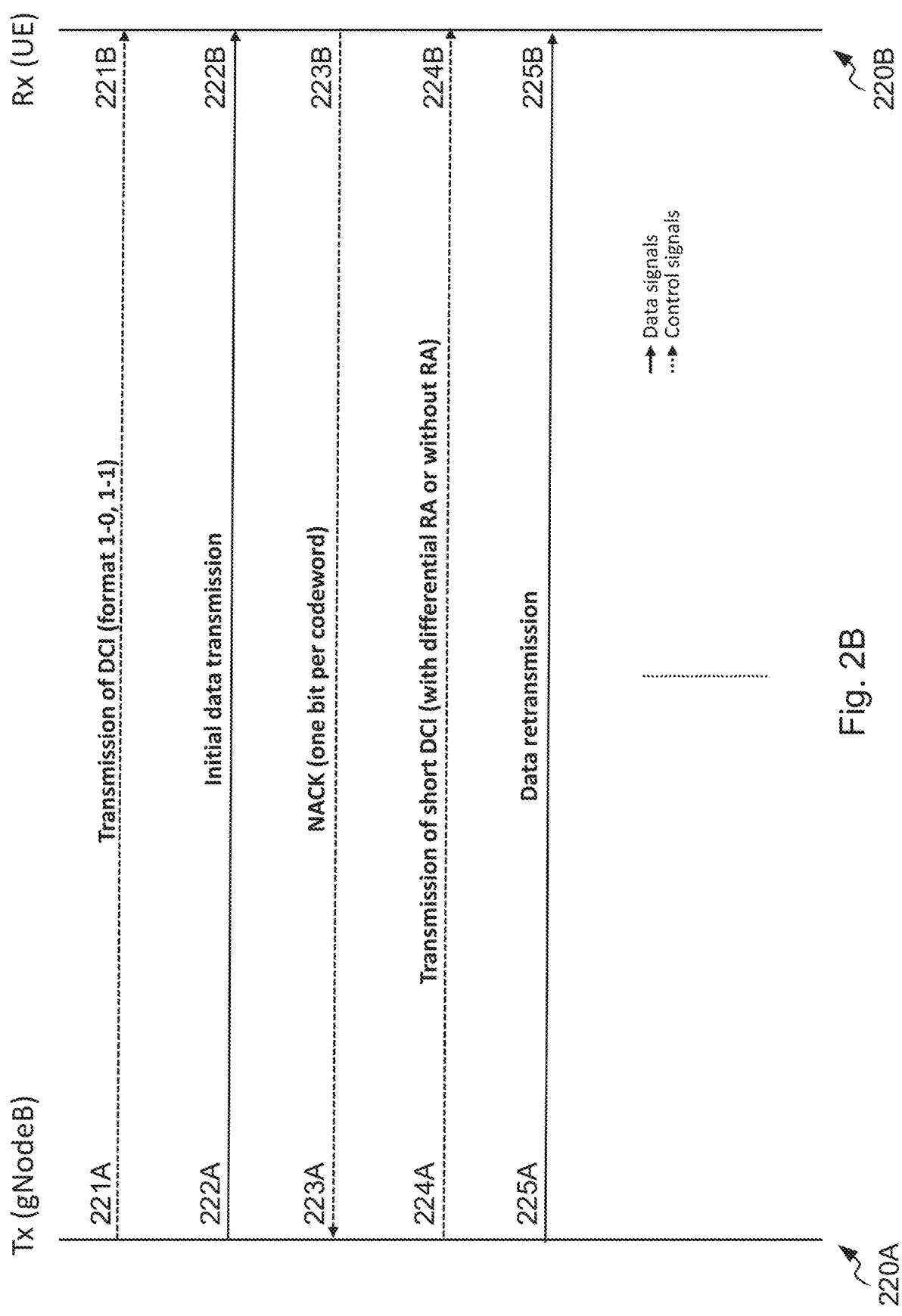
FIG. 2B is another signaling diagram illustrating a method according to one exemplary embodiment.

FIG. 2B is another signaling diagram illustrating methods 220A and 220B in DL data transmission according to an embodiment. The method 220A relates to the transmitting end functionality, and the method 220B relates to the receiving end functionality. In this example, the transmitting network device comprises a network node device, and the receiving network device comprises a client device.

At operation 221A, a downlink control information (DCI) transmission comprising control information for a subsequent HARQ transmission is transmitted from the transmitting network device. At operation 221B, the DCI transmission is received at the receiving network device. The DCI transmission is e.g. of the format 1-0, 1-1.

At operation 222A, a hybrid automatic repeat request, HARQ, transmission (also referred to as initial data transmission herein) is transmitted from the transmitting network device. At operation 222B, the HARQ transmission is received at the receiving network device. One or more residual errors in the received HARQ transmission are detected by the receiving network device.

At operation 223B, the receiving network device sends a retransmission request that comprises a retransmission indication for at least one segment of consecutive forward error correction, FEC, encoded bits stored in a buffer of the transmitting network device. The at least one segment of consecutive FEC encoded bits indicated to be retransmitted may correspond with the detected one or more residual errors. The at least one segment of consecutive FEC encoded bits to be retransmitted may be determined based on the received control information.

The retransmission indication may comprise a negative acknowledgement, NACK, signal (e.g. one bit per code word). At operation 223A, the retransmission request is received at the transmitting network device. Based on the received retransmission indication, the transmitting network device determines the at least one segment of consecutive FEC encoded bits stored in the buffer of the transmitting network device to be retransmitted. Here, the transmitting network device may determine a starting position of the at least one segment of consecutive FEC encoded bits based on predetermined starting positions associated with each retransmission occasion. Furthermore, the transmitting network device may determine a length of the at least one segment of consecutive FEC encoded bits based on a predetermined retransmission profile associated with the transmitting network device and the receiving network device. Such a retransmission profile comprises retransmission occasion specific segment length indicators.

At optional operation 224A, the transmitting network device sends a short DCI, optionally with a differential resource allocation indication for the requested retransmission, or without a resource allocation indication. The differential resource allocation indication indicates resource allocations to be added or removed with respect to the initially received HARQ transmission. At optional operation 224B, the short DCI is received at the receiving network device. Resource allocation is adjusted accordingly for the requested retransmission.

At operation 225A, the determined at least one segment of consecutive FEC encoded bits (i.e. data) is retransmitted from the transmitting network device. At operation 225B, the data retransmission is received at the receiving network device.

The method 220A may be performed by the transmitting network device 110. Further features of the method 220A directly result from the functionalities of the transmitting network device 110. The method 220A can be performed by computer-executable codes. The method 220B may be performed by the receiving network device 100. Further features of the method 220B directly result from the functionalities of the receiving network device 100. The method 220B can be performed by computer-executable codes.

Figure 2C:
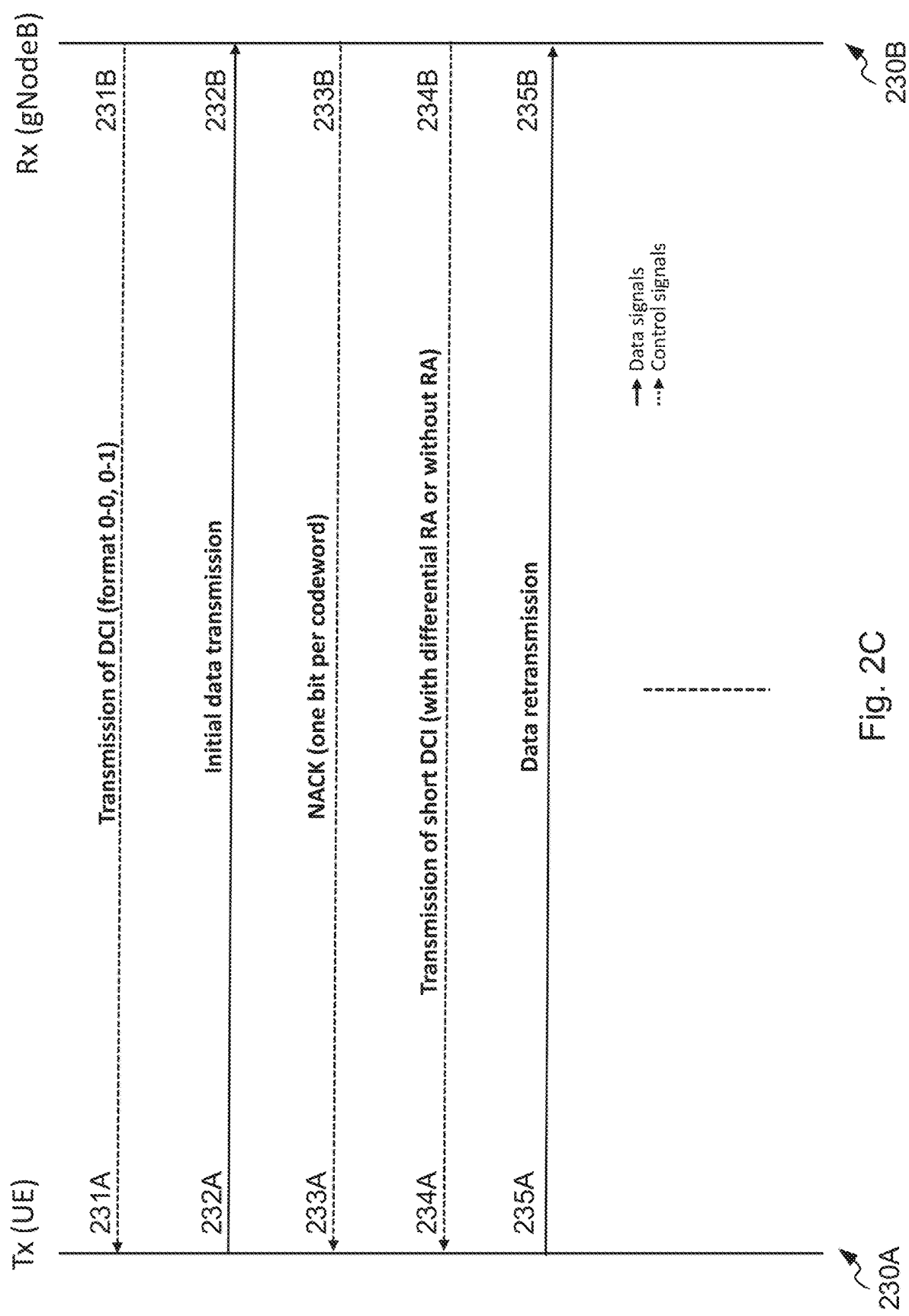
FIG. 2C is yet another signaling diagram illustrating a method according to one exemplary embodiment.

FIG. 2C is a signaling diagram illustrating methods 230A and 230B according to an embodiment.

FIG. 2C is another signaling diagram illustrating methods 230A and 230B in UL data transmission according to an embodiment. The method 230A relates to the transmitting end functionality, and the method 230B relates to the receiving end functionality. In this example, the transmitting network device comprises a client device, and the receiving network device comprises a network node device.

At operation 231B, a downlink control information, DCI, transmission comprising control information for a subsequent HARQ transmission is transmitted from the network node device (which here is the receiving network device). At operation 231A, the DCI transmission is received at the client device (which here is the transmitting network device). The DCI transmission is e.g. of the format 0-0, 0-1.

At operation 232A, a hybrid automatic repeat request, HARQ, transmission (also referred to as initial data transmission herein) is transmitted from the transmitting network device. At operation 232B, the HARQ transmission is received at the receiving network device. One or more residual errors in the received HARQ transmission are detected by the receiving network device.

At operation 233B, the receiving network device sends a retransmission request that comprises a retransmission indication for at least one segment of consecutive forward error correction, FEC, encoded bits stored in a buffer of the transmitting network device. The at least one segment of consecutive FEC encoded bits indicated to be retransmitted may correspond with the detected one or more residual errors. The at least one segment of consecutive FEC encoded bits to be retransmitted may be determined based on the received control information.

The retransmission indication may comprise a negative acknowledgement, NACK, signal (e.g. one bit per code word). At operation 233A, the retransmission request is received at the transmitting network device. Based on the received retransmission indication, the transmitting network device determines the at least one segment of consecutive FEC encoded bits stored in the buffer of the transmitting network device to be retransmitted. Here, the transmitting network device may determine a starting position of the at least one segment of consecutive FEC encoded bits based on predetermined starting positions associated with each retransmission occasion. Furthermore, the transmitting network device may determine a length of the at least one segment of consecutive FEC encoded bits based on a predetermined retransmission profile associated with the transmitting network device and the receiving network device. Such a retransmission profile comprises retransmission occasion specific segment length indicators.

At optional operation 234B, the network node device (which here is the receiving network device) sends a short DCI, optionally with a differential resource allocation indication for the requested retransmission, or without a resource allocation indication. The differential resource allocation indication indicates resource allocations to be added or removed with respect to the initially received HARQ transmission. At optional operation 234A, the short DCI is received at the client device (which here is the transmitting network device). Resource allocation is adjusted accordingly for the requested retransmission.

At operation 235A, the determined at least one segment of consecutive FEC encoded bits (i.e. data) is retransmitted from the transmitting network device. At operation 235B, the data retransmission is received at the receiving network device.

The method 230A may be performed by the transmitting network device 110. Further features of the method 230A directly result from the functionalities of the transmitting network device 110. The method 230A can be performed by computer-executable codes. The method 230B may be performed by the receiving network device 100. Further features of the method 230B directly result from the functionalities of the receiving network device 100. The method 230B can be performed by computer-executable codes. Table 1 below compares the different examples above in terms of the number of feedback bits for the same total number of transmissions:

TABLE 1

The number of feedback bits needed in case of NACK per code word

| | |
|---|---|
| NR | 1-8 bits (8 bits if code word segmentation is applied) |
| Example 1 | $n_f = \log_2 \lceil N_{cb}/n_{step} \rceil$ may be comparable to NR, associated with NACK and being predefined |
| Example 2 | Same as NR |
| Example 3 | $n_f = \left\lceil \log_2\left(\dfrac{N_P}{|\mathcal{P}|}\right) \right\rceil$ |

In the following, examples of simulation results are discussed with reference to FIGS. 7A to 7D.

The performance of various examples herein has been evaluated via link-level simulations. The achieved SE versus received SNR on an additive white Gaussian noise (AWGN) channel have been plotted for up to two/four transmissions.

Here, SE is defined as:

$$SE = mk/\overline{P} \quad (10)$$

where $\overline{P}$ is the average number of coded bits per message, m is the modulation order and $k = P_0 R_0$ is the number of information bits in the message.

That is, for each SNR, SE is calculated as the total number of information bits divided by the total number of used resources for transmission. The total number of used resources for transmission can be calculated as a total number of transmitted coded bits divided by the modulation order.

Non-Uniform RP:

A non-uniform RP of type Eq. (7) is chosen after optimization as r=[0.5803,1.2086,1.2086]. The number of coded bits for the initial transmission ($P_0$) is selected based on a 15-level CQI table for URLLC with target BLER=$10^{-5}$ shown in Table 2.

TABLE 2

CQI table for target BLER 10-5.

| CQI index | modulation | code rate x 1024 | efficiency |
|---|---|---|---|
| 0 | | out of range | |
| 1 | QPSK | 30 | 0.0586 |
| 2 | QPSK | 50 | 0.0977 |
| 3 | QPSK | 78 | 0.1523 |
| 4 | QPSK | 120 | 0.2344 |
| 5 | QPSK | 193 | 0.3770 |
| 6 | QPSK | 308 | 0.6016 |
| 7 | QPSK | 449 | 0.8770 |
| 8 | QPSK | 602 | 1.1758 |
| 9 | 16QAM | 378 | 1.4766 |
| 10 | 16QAM | 490 | 1.9141 |
| 11 | 16QAM | 616 | 2.4063 |
| 12 | 64QAM | 466 | 2.7305 |
| 13 | 64QAM | 567 | 3.3223 |
| 14 | 64QAM | 666 | 3.9023 |
| 15 | 64QAM | 772 | 4.5234 |

Figure 7A:
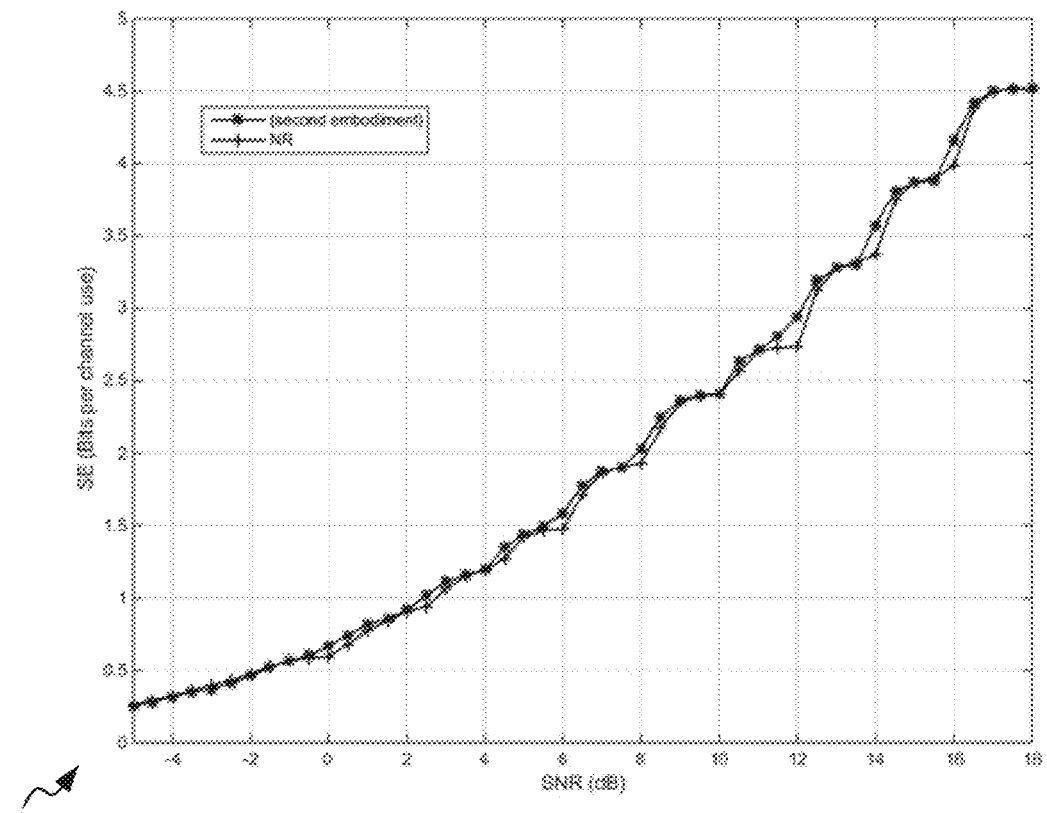
FIGS. 7A to 7D are diagrams illustrating simulation results according to exemplary embodiments.

FIG. 7A (SE versus SNR for an optimized re-transmission profile) shows the results corresponding to all 15 MCSs in Table 2 according to one exemplary embodiment. A resource allocation of 50 resource elements (REs) has been considered for the initial transmission, and simulation parameters such as LDPC code base matrix (BM), modulation and code rate have been derived based on 3GPP NR specification. The SE performance corresponding to the RP determined according to the retransmission profile using examples above is plotted in diagram 710 of FIG. 7A, as shown. For comparison, SE performance of baseline NR with uniform retransmission profile r=[1,1,1] is also plotted in diagram 710 of FIG. 7A, as shown.

It can be seen that using a unique RP for the whole MCS table, a SNR gain of up to 0.8 dB (for SE of 2.7) over NR is obtained without increasing the amount of feedback signaling for SE above 1 bit/s/Hz.

In the case where the retransmission profile is used to shorten the size of DCI, a gain related to reduction of DCI length in downlink control information used to schedule the PUSCH is also obtained, provided that the client device performs blind decoding over both DCIs.

The SNR gain that can be read on the curve of FIG. 7A is shown in Table 3:

TABLE 3

SNR gain from FIG. 7A

| SE | Gain [dB] |
|---|---|
| 4 | 0.7 |
| 3.5 | 0.8 |
| 2.8 | 1 |
| 2 | 0.5 |
| 1.5 | 0.7 |
| 1 | 0.7 |
| 0.5 | 0.7 |

In other regions of SNR axis above, the performance is at least as good as NR.

Figure 7B:
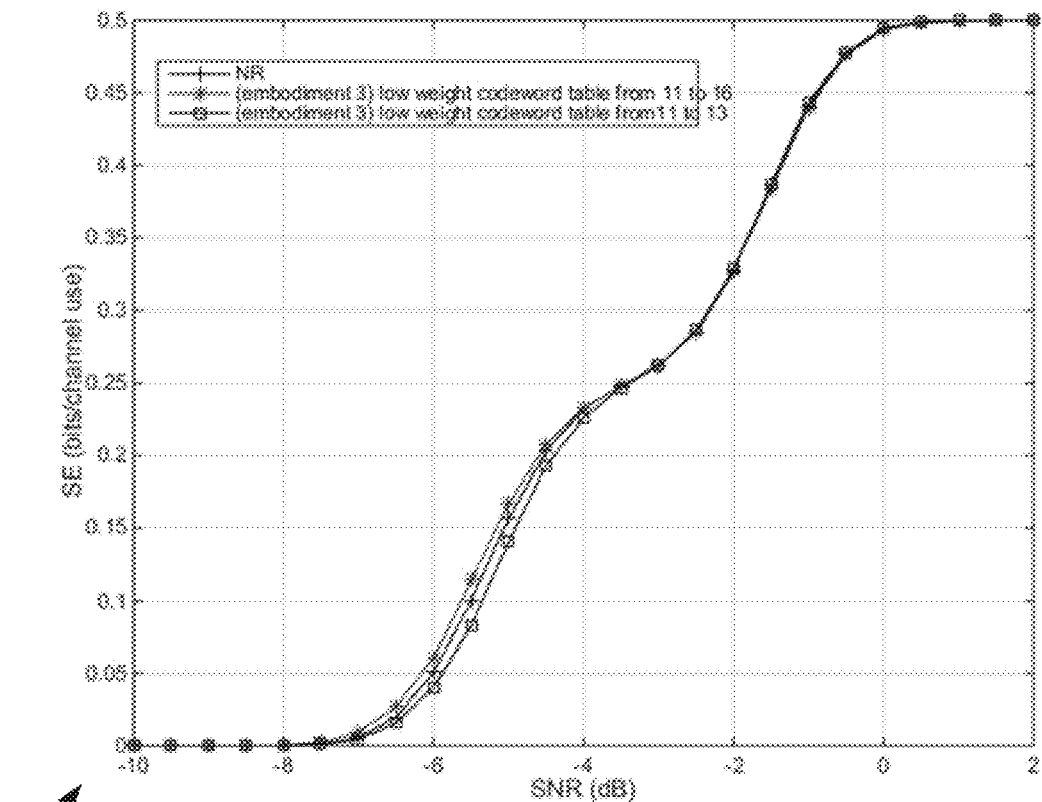

Error-prone patterns related example compared to NR and prior art (uniform RP):

Diagram 720 of FIG. 7B (SE versus SNR with error-prone patterns compared to NR) shows performance evaluation results for NR with uniform retransmission profile and no more than two transmissions. The maximum number of transmissions can be configured semi-statically on NR, if needed. FIG. 7B compares NR with maximum number of two transmissions with the error-prone patterns related example above that has been evaluated using error-prone patterns corresponding to minimum Hamming weight LDPC code words. In order to build the common error pattern table, a heuristic search was performed.

Selected modulation in this case is BPSK. Initial code rate is $R_0$=0.5 and lifting factor is Z=4 with NR LDPC base matrix $BM_1$. The value of $P_0$=176.

For the error-prone patterns related example, the common error pattern table contains light code words with Hamming weight in the range 11-13 and in the range 11-16. In the first case (Hamming weight range 11-13), the feedback signaling size is 9 bits, and in the second case 13 bits is needed.

It can be seen from FIG. 7B that there is a gain of up to 0.3 dB over NR for the case with Hamming weight range 11-16.

Active feedback and RP related examples compared to NR and prior art (non-uniform retransmission profile):

Here, the case of non-uniform retransmission profile r=[0.6818,1.591,1.591] with up to four transmissions is compared with the case of NR LDPC BM1 with lifting factor Z=4. The retransmission profile is chosen as described in Eq. (7). Initial transmission code rate is $R_0$=0.5 and $P_0$=176 for BPSK. For the case of the active feedback example, step size is $n_{step}$=1 leading to a signaling size of 9 bits, while NR has up to 8 bits of signaling. For NR, a uniform retransmission profile r=[1,1,1] is used. It can be seen from diagram 730 of FIG. 7C that the above active feedback and RP related examples show gain over NR for SE larger than 0.5 with the solution according to the active feedback related example performing slightly better than the RP related example.

Figure 7C:
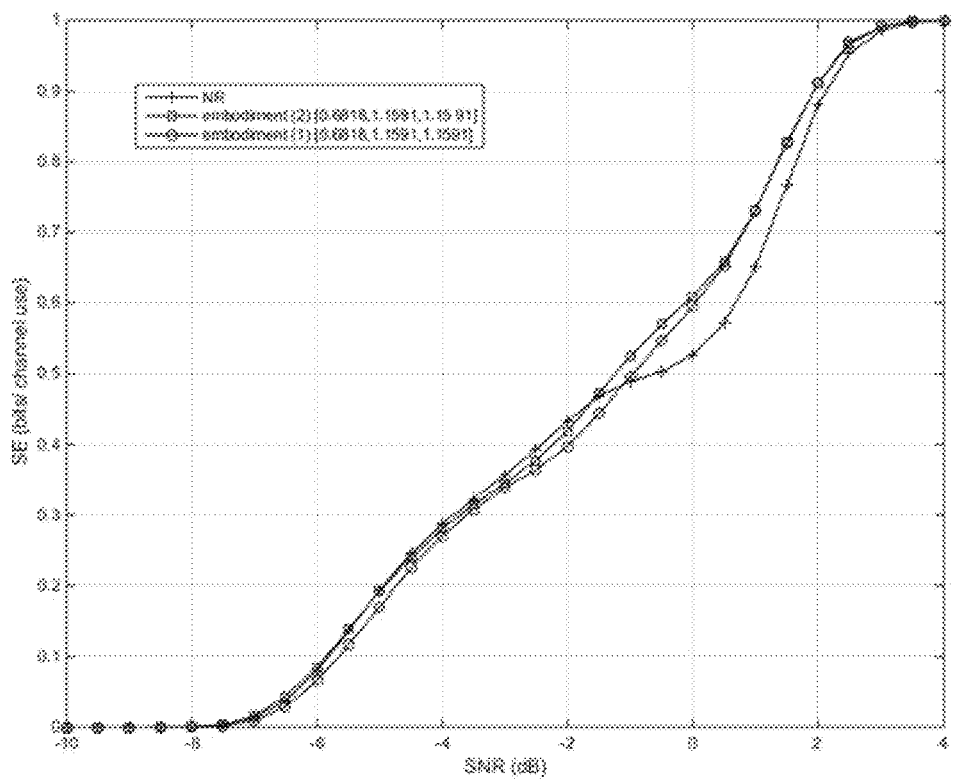
Figure 7D:
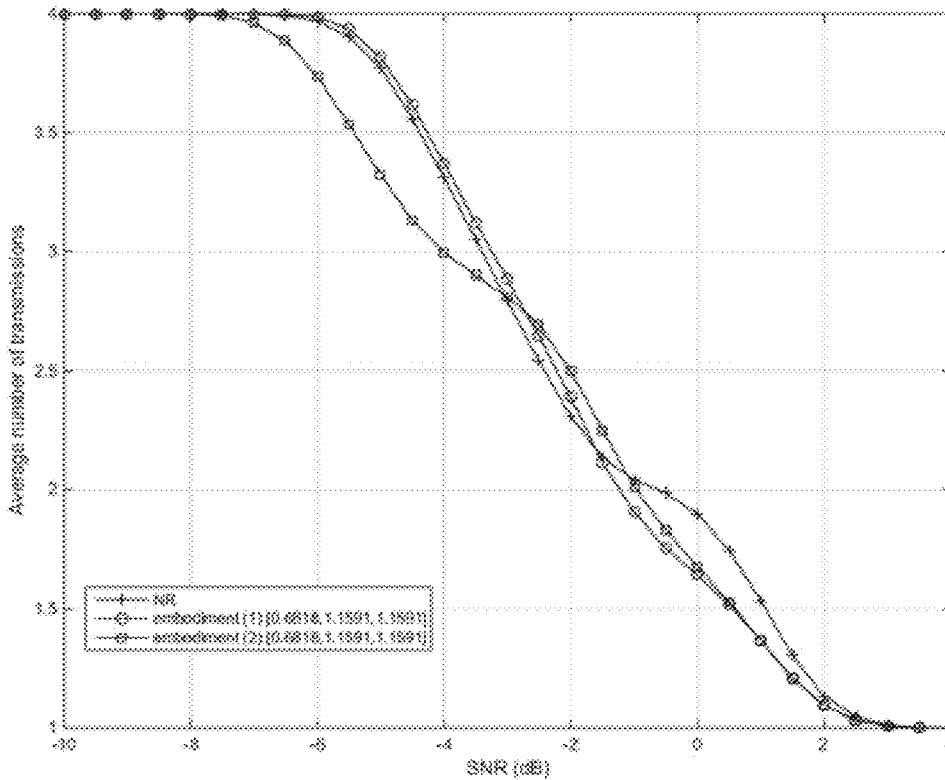

In diagram 740 of FIG. 7D (average number of re-transmission compared to NR), average numbers of transmissions are compared. It is to be noted that counting the (total or average) number of transmissions is not a clean or fair evaluation when comparing schemes with different RPs. Instead, a fair metric is one that considers not only the average number of transmissions but also the average size of code words that changes from one retransmission to another. In order to do so, the transmission count can be normalized with the size of transmissions to be able to compare different schemes.

It can be seen from FIG. 7D that in the region between −2-4 dB, corresponding to an initial transmission and a first retransmission (where there is SE gain for the active feedback and RP related examples), NR has the largest average number of transmissions. The active feedback related example has the smallest average number of retransmissions for the lowest SNR.

Based on these results, technical advantages of having both the retransmission profile and active feedback together can be emphasized: it can be seen that for active feedback related example where both the retransmission profile and the active feedback are present, there is higher spectral efficiency (FIG. 7C). It can also be seen that there is a smaller number of transmissions when the retransmission profile is used (FIG. 7D, RP related examples) and SNR is below −2 dB.

The functionality described herein can be performed, at least in part, by one or more computer program product components such as software components. According to an embodiment, the receiving network device 100 and/or network node device 110 comprise a processor configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and Graphics Processing Units (GPUs).

Any range or device value given herein may be extended or altered without losing the effect sought. Also any embodiment may be combined with another embodiment unless explicitly disallowed.

Although the subject matter has been described in language of structural features and/or acts, it is to be understood that the subject matter defined in the appended claims is not necessarily limited to the exemplary features or acts described above. Rather, the exemplary features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term "comprising" is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

What is claimed is:

1. A receiving network device for wireless communication, comprising a transceiver and a processor, wherein:
   the transceiver is configured to:
      receive a hybrid automatic repeat request (HARQ) transmission from a transmitting network device, and
   the processor is configured to:
      detect one or more residual errors in the received HARQ transmission; and
      send a retransmission request comprising a retransmission indication for at least one segment of consecutive forward error correction (FEC) encoded bits that are stored in a buffer of the transmitting network device, wherein the retransmission indication comprises a negative acknowledgement (NACK) signal, and an indication of a dynamically determined starting position of the at least one segment of consecutive FEC encoded bits, and wherein the processor is further configured to:
perform the dynamic determination of the starting position of the at least one segment of consecutive FEC encoded bits based on minimizing sum reliability of segments of consecutive FEC decoded bits that are stored in a buffer of the receiving network device.

2. The receiving network device for wireless communication according to claim 1, wherein the HARQ transmission comprises at least one segment of consecutive FEC encoded bits that are stored in the buffer of the transmitting network device.

3. The receiving network device for wireless communication according to claim 1, wherein the transceiver is further configured to receive or send a downlink control information (DCI) transmission comprising control information for the HARQ transmission.

4. The receiving network device for wireless communication according to claim 3, wherein the processor is further configured to determine the at least one segment of consecutive FEC encoded bits that are to be retransmitted and are stored in the buffer of the transmitting network device based on the control information.

5. The receiving network device for wireless communication according to claim 1, wherein the retransmission indication further comprises an indication of a length of the at least one segment of consecutive FEC encoded bits.

6. The receiving network device for wireless communication according to claim 1, wherein the transceiver is further configured to receive HARQ retransmissions based on a predetermined retransmission profile comprising retransmission occasion specific segment length indicators.

7. The receiving network device for wireless communication according to claim 6, wherein the processor is further configured to determine a segment length of the at least one segment of consecutive FEC encoded bits based on the predetermined retransmission profile and a length of an initial HARQ transmission occasion.

8. The receiving network device for wireless communication according to claim 6, wherein at least one retransmission occasion specific segment length indicator in the predetermined retransmission profile provides an indication for a shorter retransmission segment than an initial HARQ transmission segment.

9. The receiving network device for wireless communication according to claim 1, wherein the transceiver is further configured to receive or send a differential resource allocation indication for the requested retransmission, the differential resource allocation indication indicating resource allocations that are to be added or removed with respect to the initially received HARQ transmission.

10. The receiving network device for wireless communication according to claim 1, wherein the buffer of the transmitting network device comprises a circular buffer.

11. The receiving network device for wireless communication according to claim 1, wherein the receiving network device comprises one of a client device and a network node device, and the transmitting network device comprises one of the network node device and the client device, respectively.

12. A non-transitory computer-readable medium, having computer-executable instructions stored thereon, the computer-executable instructions, when executed by one or more processor, cause a processor to facilitate:

receiving, at a receiving network device for wireless communication, a hybrid automatic repeat request (HARQ) transmission from a transmitting network device;

detecting, by the receiving network device, one or more residual errors in the received HARQ transmission; and sending, by the receiving network device, a retransmission request comprising a retransmission indication for at least one segment of consecutive forward error correction (FEC) encoded bits that are stored in a buffer of the transmitting network device, wherein the retransmission indication comprises a negative acknowledgement (NACK) signal, and an indication of a dynamically determined starting position of the at least one segment of consecutive FEC encoded bits, and wherein the processor is further caused to facilitate:
performing, by the receiving network device, the dynamic determination of the starting position of the at least one segment of consecutive FEC encoded bits based on minimizing sum reliability of segments of consecutive FEC decoded bits that are stored in a buffer of the receiving network device.

13. A transmitting network device for wireless communication, comprising a transceiver and a processor, wherein:

the transceiver is configured to:
transmit a hybrid automatic repeat request (HARQ) transmission to a receiving network device; and
receive a retransmission request comprising a retransmission indication for at least one segment of consecutive forward error correction (FEC) encoded bits that are stored in a buffer of the transmitting network device, and the processor is configured to:
determine the at least one segment of consecutive FEC encoded bits that are stored in the buffer of the transmitting network device and are to be retransmitted based on the received retransmission indication, and the transceiver is further configured to:
retransmit the determined at least one segment of consecutive FEC encoded bits to the receiving network device, wherein the retransmission indication comprises a negative acknowledgement (NACK) signal, and wherein the retransmission indication further comprises an indication of a dynamically determined starting position of the at least one segment of consecutive FEC encoded bits, which is obtained through performing, by the receiving network device, the dynamic determination of the starting position of the at least one segment of consecutive FEC encoded bits based on minimizing sum reliability of segments of consecutive FEC decoded bits that are stored in a buffer of the receiving network device.

14. The transmitting network device for wireless communication according to claim 13, wherein the HARQ transmission comprises at least one segment of consecutive FEC encoded bits that are stored in the buffer of the transmitting network device.

15. The transmitting network device for wireless communication according to claim 13, wherein the retransmission indication further comprises an indication of a length of the at least one segment of consecutive FEC encoded bits.

16. The transmitting network device for wireless communication according to claim 13, wherein the processor is further configured to determine the starting position of the at least one segment of consecutive FEC encoded bits based on predetermined starting positions associated with each retransmission occasion.

17. The transmitting network device for wireless communication according to claim 13, wherein the processor is further configured to determine a length of the at least one segment of consecutive FEC encoded bits based on a predetermined retransmission profile comprising retransmission occasion specific segment length indicators.

18. The transmitting network device for wireless communication according to claim 17, wherein the segment length of the at least one segment of consecutive FEC encoded bits is based on the predetermined retransmission profile and a length of an initial HARQ transmission occasion.

19. The transmitting network device for wireless communication according to claim 17, wherein at least one retransmission occasion specific segment length indicator in the predetermined retransmission profile provides an indication for a shorter retransmission segment than an initial HARQ transmission segment.

20. The transmitting network device for wireless communication according to claim 13, wherein the transceiver is further configured to send or receive a differential resource allocation indication for the requested retransmission, the differential resource allocation indication indicating resource allocations that are to be added or removed with respect to the initially transmitted HARQ transmission, and the processor is further configured to adjust resource allocation accordingly for the requested retransmission.

21. The transmitting network device for wireless communication according to claim 13, wherein the transceiver is further configured to receive or send a resource allocation adjusted to the largest value in the predetermined retransmission profile.

22. The transmitting network device for wireless communication according to claim 13, wherein the buffer of the transmitting network device comprises a circular buffer.

23. The transmitting network device for wireless communication according to claim 13, wherein the transmitting network device comprises one of a network node device and a client device, and the receiving network device comprises one of the client device and the network node device, respectively.

24. A non-transitory computer-readable medium, having computer-executable instructions stored thereon, the computer-executable instructions, when executed by one or more processor, cause a processor to facilitate:
  transmitting, at a transmitting network device for wireless communication, a hybrid automatic repeat request (HARQ) transmission to a receiving network device;
  receiving, by the transmitting network device, a retransmission request comprising a retransmission indication for at least one segment of consecutive forward error correction (FEC) encoded bits that are stored in a buffer of the transmitting network device;
  determining, by the transmitting network device, the at least one segment of consecutive FEC encoded bits that are stored in the buffer of the transmitting network device and are to be retransmitted based on the received retransmission indication; and
  retransmitting, by the transmitting network device, the determined at least one segment of consecutive FEC encoded bits to the receiving network device,
  wherein the retransmission indication comprises a negative acknowledgement (NACK) signal, and
  wherein the retransmission indication further comprises an indication of a dynamically determined starting position of the at least one segment of consecutive FEC encoded bits, which is obtained through performing, by the receiving network device, the dynamic determination of the starting position of the at least one segment of consecutive FEC encoded bits based on minimizing sum reliability of segments of consecutive FEC decoded bits that are stored in a buffer of the receiving network device.

* * * * *